US012598049B2

(12) United States Patent
Abotabl et al.

(10) Patent No.: US 12,598,049 B2
(45) Date of Patent: Apr. 7, 2026

(54) FULL-DUPLEX PARTIAL UPLINK TRANSMISSIONS

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Marwen Zorgui, San Diego, CA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 581 days.

(21) Appl. No.: 18/062,943

(22) Filed: Dec. 7, 2022

(65) Prior Publication Data

US 2024/0195596 A1 Jun. 13, 2024

(51) Int. Cl.
| | |
|---|---|
| *H04W 72/04* | (2023.01) |
| *H04L 5/14* | (2006.01) |
| *H04W 72/0446* | (2023.01) |
| *H04W 72/1268* | (2023.01) |

(52) U.S. Cl.
CPC .......... *H04L 5/14* (2013.01); *H04W 72/0446* (2013.01); *H04W 72/1268* (2013.01)

(58) Field of Classification Search
None
See application file for complete search history.

(56) References Cited

U.S. PATENT DOCUMENTS 12,328,765 B2 * 6/2025 Hassan ............. H04W 74/0825

* cited by examiner

*Primary Examiner* — Willie J Daniel, Jr.
(74) *Attorney, Agent, or Firm* — Harrity & Harrity, LLP

(57) ABSTRACT
Various aspects of the present disclosure generally relate to wireless communication. In some aspects, a user equipment (UE) may obtain slot information that indicates whether a slot is a half-duplex slot or a full-duplex slot and that indicates a frequency structure of the full-duplex slot. The UE may receive segmentation information that indicates a plurality of slot segments within the slot and that indicates a skipping order for the plurality of slot segments. The UE may initiate a partial uplink transmission. The UE may perform resource skipping in one or more slot segments of the plurality of slot segments based at least in part on the slot information and the segmentation information. Numerous other aspects are described.

30 Claims, 18 Drawing Sheets

800

700
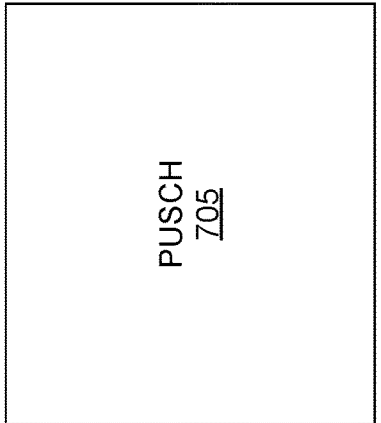
PUSCH
705
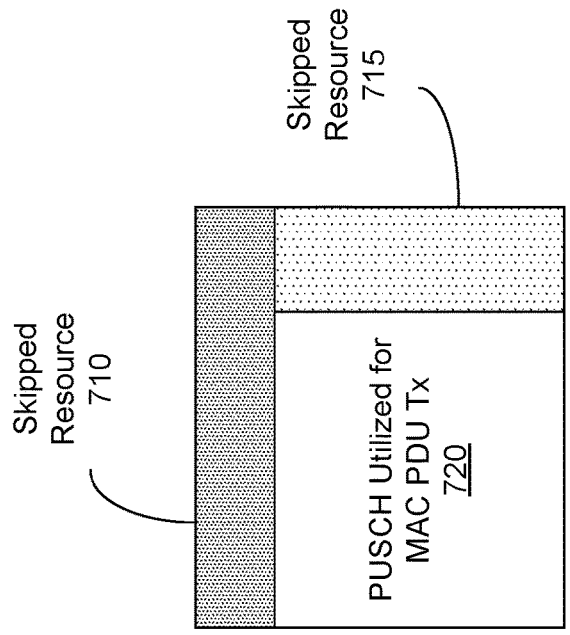
Skipped
Resource
710
Skipped
Resource
715
PUSCH Utilized for
MAC PDU Tx
720
FIG. 7

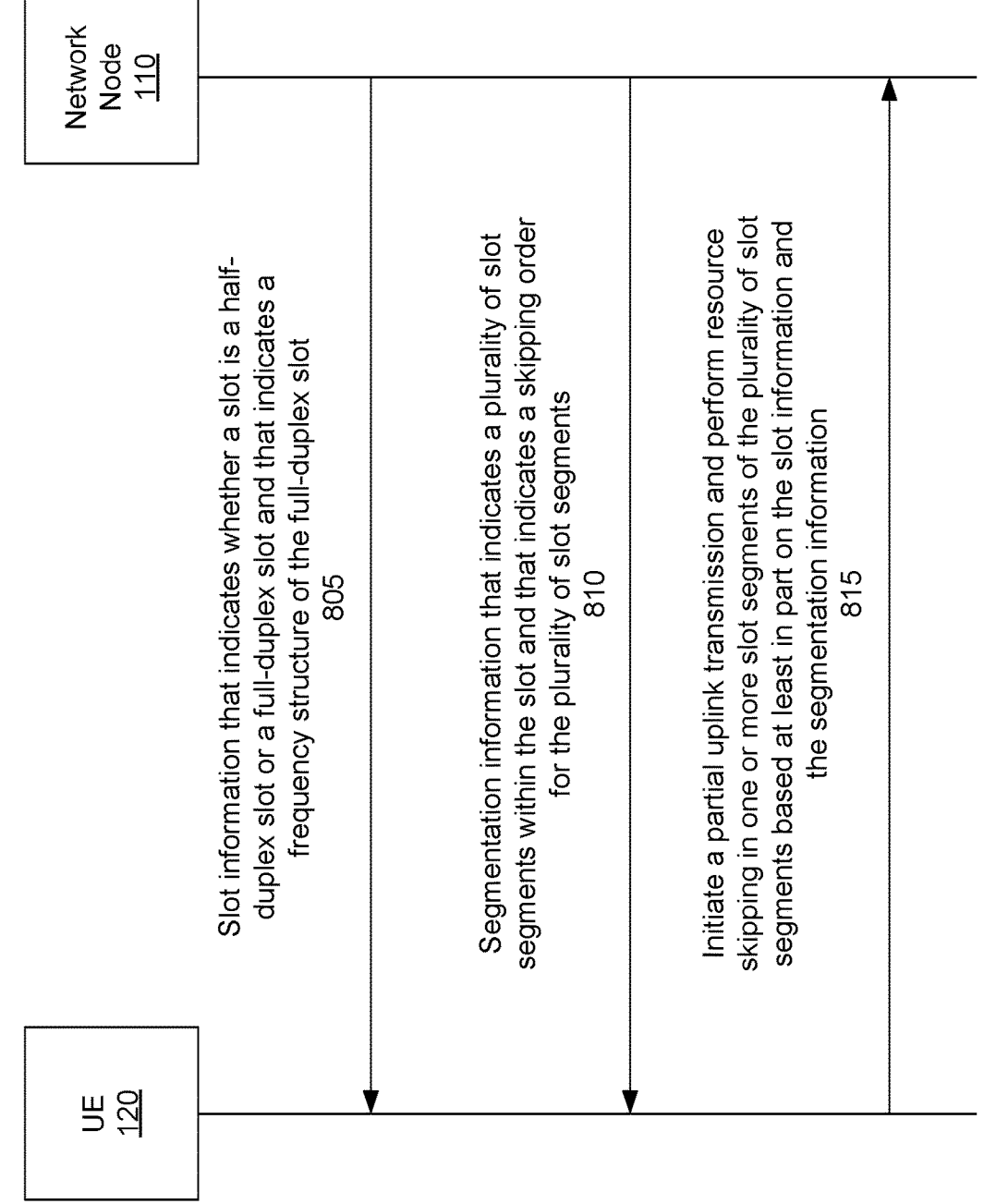

Network Node 110

UE 120

Slot information that indicates whether a slot is a half-duplex slot or a full-duplex slot and that indicates a frequency structure of the full-duplex slot
805

Segmentation information that indicates a plurality of slot segments within the slot and that indicates a skipping order for the plurality of slot segments
810

Initiate a partial uplink transmission and perform resource skipping in one or more slot segments of the plurality of slot segments based at least in part on the slot information and the segmentation information
815

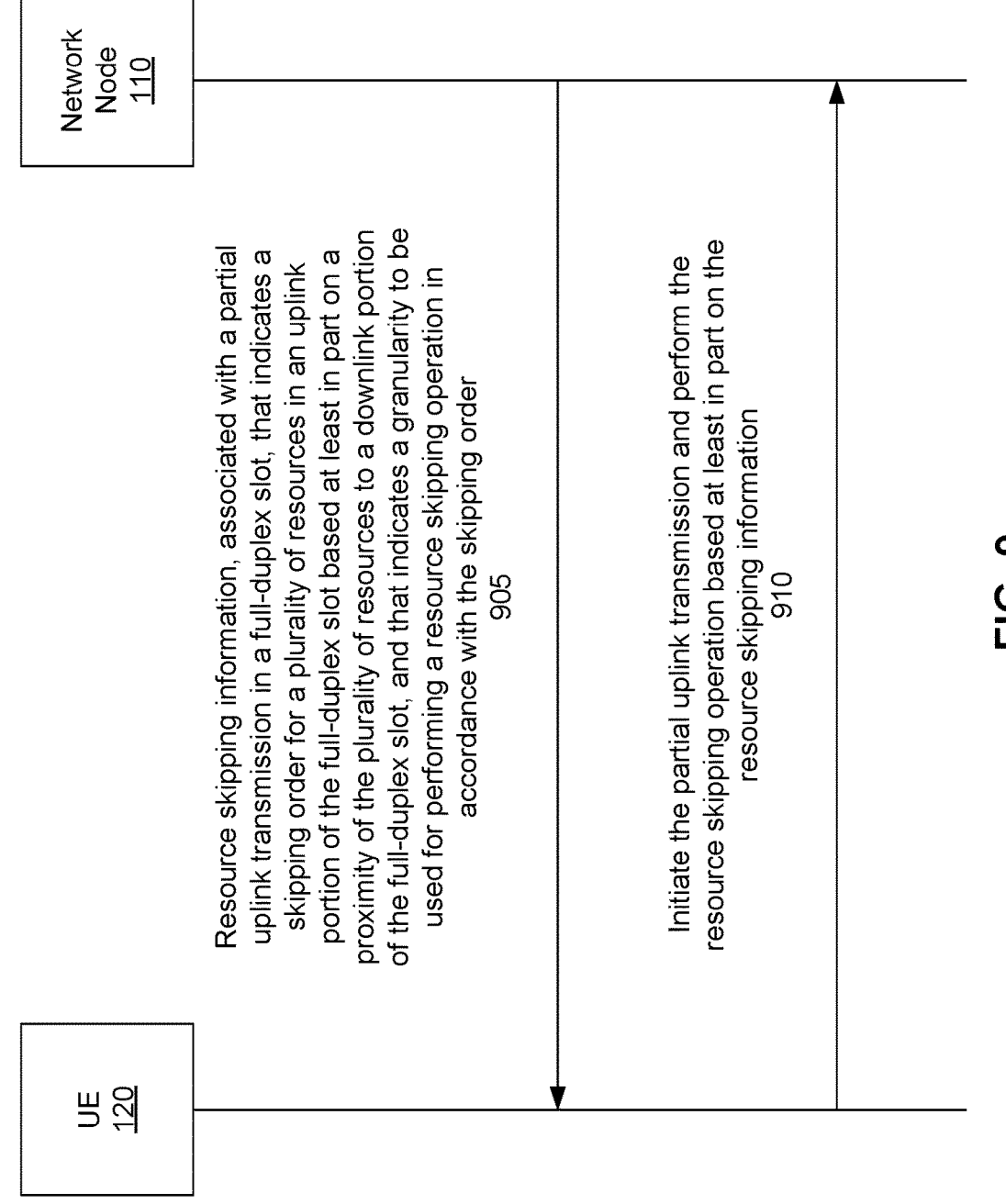

Network Node 110

UE 120

Resource skipping information, associated with a partial uplink transmission in a full-duplex slot, that indicates a skipping order for a plurality of resources in an uplink portion of the full-duplex slot based at least in part on a proximity of the plurality of resources to a downlink portion of the full-duplex slot, and that indicates a granularity to be used for performing a resource skipping operation in accordance with the skipping order
905

Initiate the partial uplink transmission and perform the resource skipping operation based at least in part on the resource skipping information
910

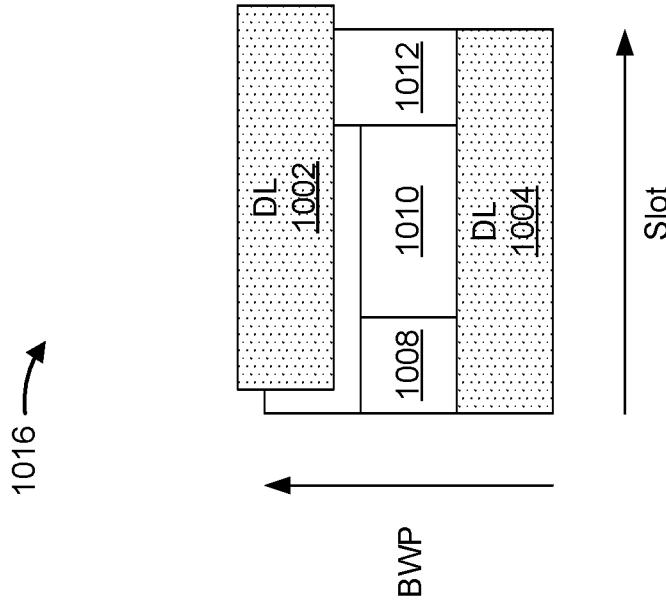
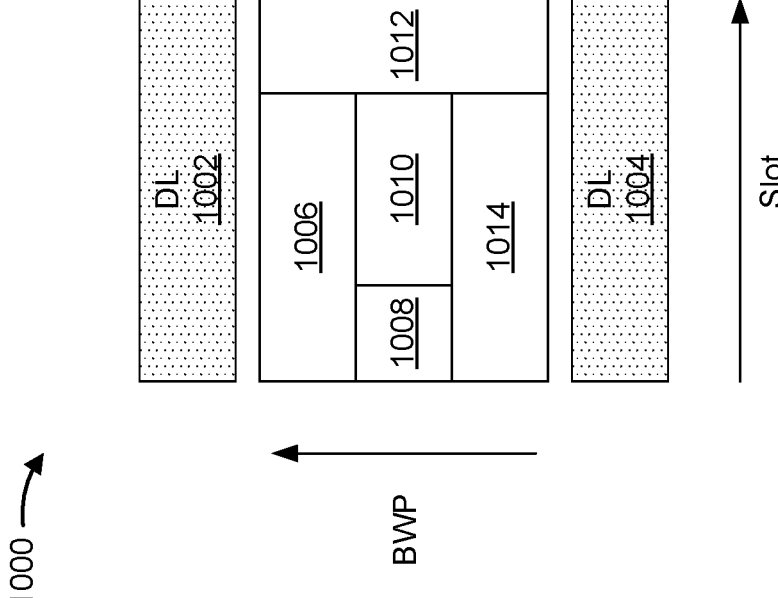
FIG. 10A

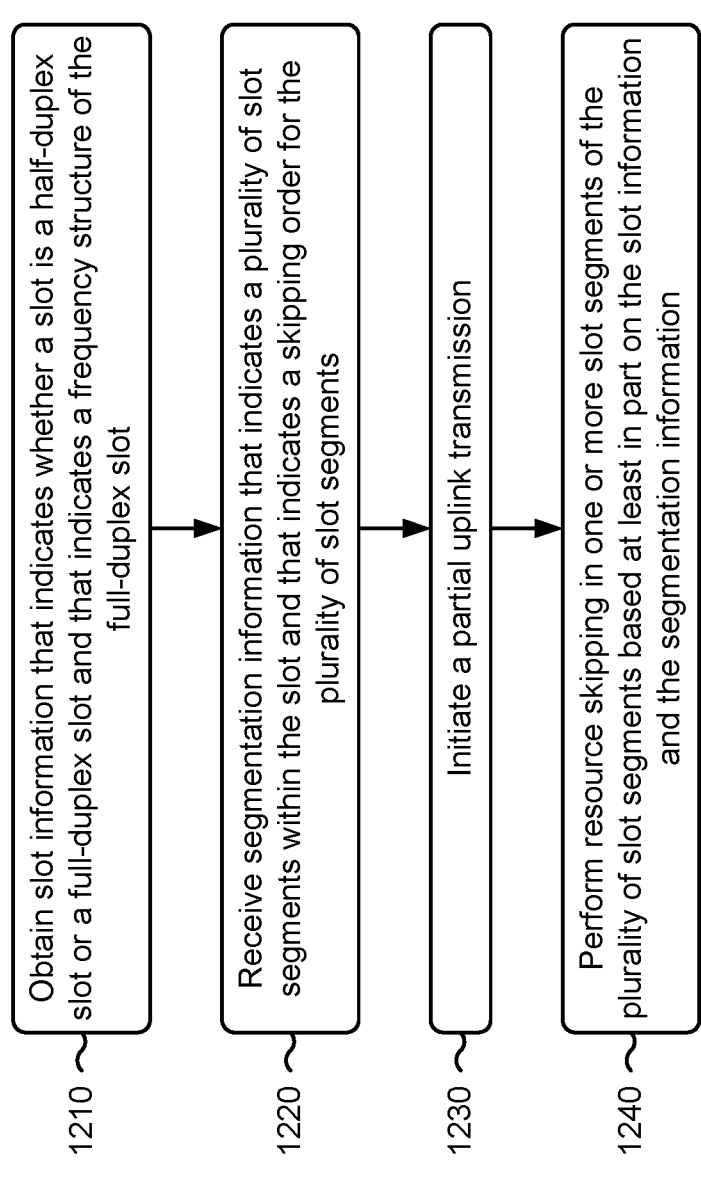

1210 — Obtain slot information that indicates whether a slot is a half-duplex slot or a full-duplex slot and that indicates a frequency structure of the full-duplex slot 1220 — Receive segmentation information that indicates a plurality of slot segments within the slot and that indicates a skipping order for the plurality of slot segments 1230 — Initiate a partial uplink transmission 1240 — Perform resource skipping in one or more slot segments of the plurality of slot segments based at least in part on the slot information and the segmentation information

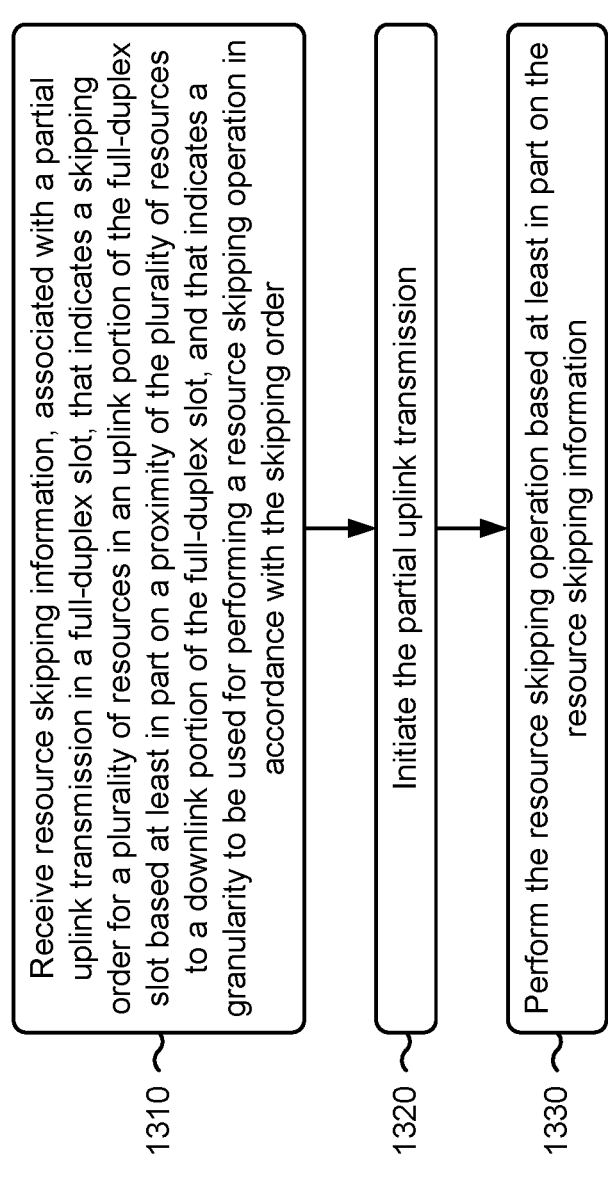

1300

1310   Receive resource skipping information, associated with a partial uplink transmission in a full-duplex slot, that indicates a skipping order for a plurality of resources in an uplink portion of the full-duplex slot based at least in part on a proximity of the plurality of resources to a downlink portion of the full-duplex slot, and that indicates a granularity to be used for performing a resource skipping operation in accordance with the skipping order 1320   Initiate the partial uplink transmission 1330   Perform the resource skipping operation based at least in part on the resource skipping information

FIG. 13

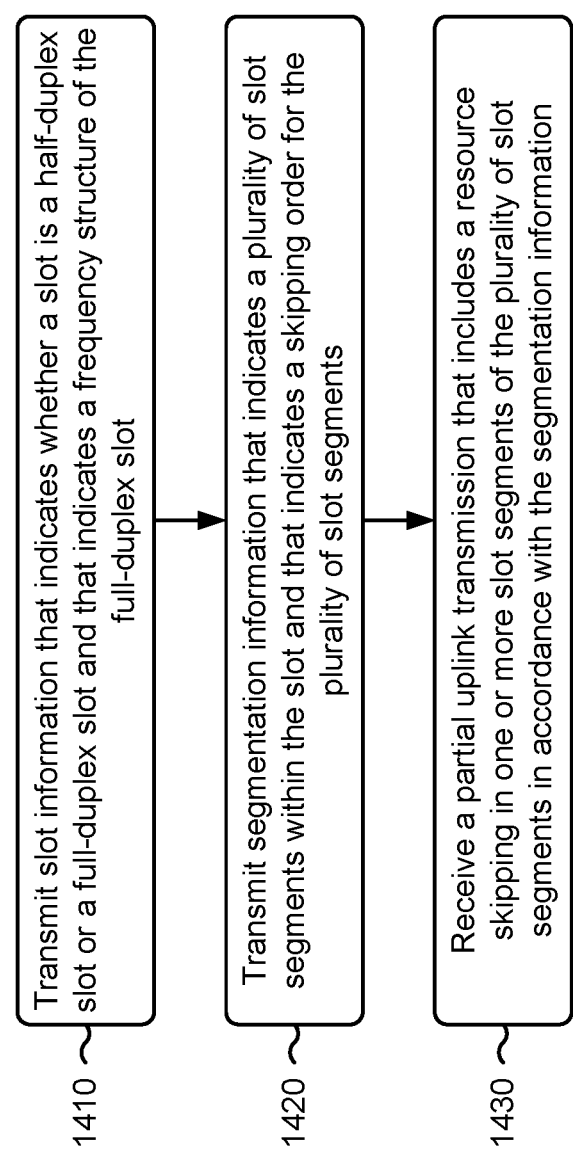

1410 Transmit slot information that indicates whether a slot is a half-duplex slot or a full-duplex slot and that indicates a frequency structure of the full-duplex slot 1420 Transmit segmentation information that indicates a plurality of slot segments within the slot and that indicates a skipping order for the plurality of slot segments 1430 Receive a partial uplink transmission that includes a resource skipping in one or more slot segments of the plurality of slot segments in accordance with the segmentation information

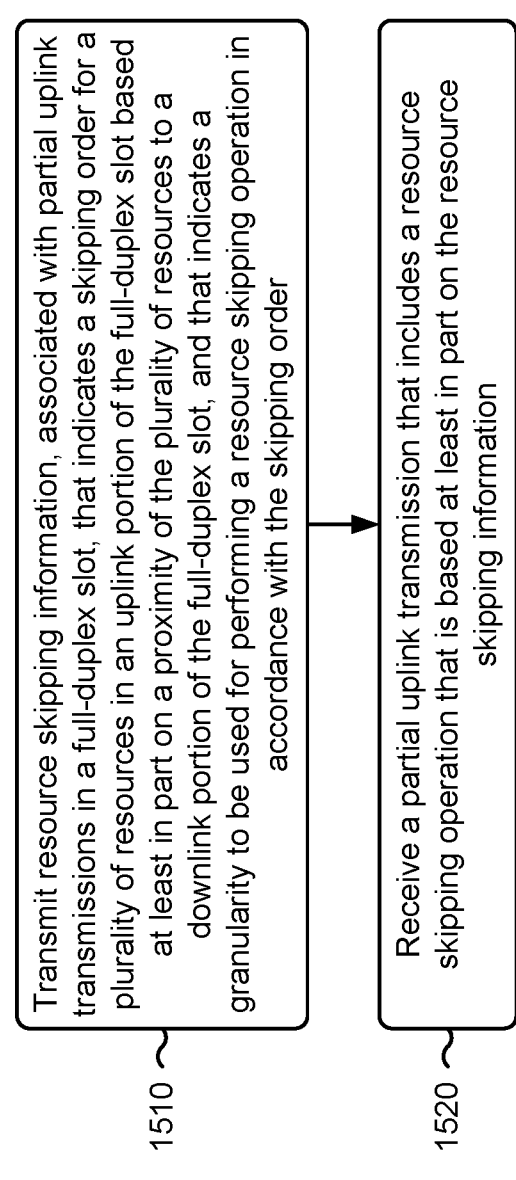

1510 Transmit resource skipping information, associated with partial uplink transmissions in a full-duplex slot, that indicates a skipping order for a plurality of resources in an uplink portion of the full-duplex slot based at least in part on a proximity of the plurality of resources to a downlink portion of the full-duplex slot, and that indicates a granularity to be used for performing a resource skipping operation in accordance with the skipping order 1520 Receive a partial uplink transmission that includes a resource skipping operation that is based at least in part on the resource skipping information

FULL-DUPLEX PARTIAL UPLINK TRANSMISSIONS

FIELD OF THE DISCLOSURE

Aspects of the present disclosure generally relate to wireless communication and to techniques and apparatuses for full-duplex partial uplink transmissions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include obtaining slot information that indicates whether a slot is a half-duplex slot or a full-duplex slot and that indicates a frequency structure of the full-duplex slot. The method may include receiving segmentation information that indicates a plurality of slot segments within the slot and that indicates a skipping order for the plurality of slot segments. The method may include initiating a partial uplink transmission. The method may include performing resource skipping in one or more slot segments of the plurality of slot segments based at least in part on the slot information and the segmentation information.

Some aspects described herein relate to a method of wireless communication performed by a UE. The method may include receiving resource skipping information, associated with a partial uplink transmission in a full-duplex slot, that indicates a skipping order for a plurality of resources in an uplink portion of the full-duplex slot based at least in part on a proximity of the plurality of resources to a downlink portion of the full-duplex slot, and that indicates a granularity to be used for performing a resource skipping operation in accordance with the skipping order. The method may include initiating the partial uplink transmission. The method may include performing the resource skipping operation based at least in part on the resource skipping information.

Some aspects described herein relate to a method of wireless communication performed by a network node. The method may include transmitting slot information that indicates whether a slot is a half-duplex slot or a full-duplex slot and that indicates a frequency structure of the full-duplex slot. The method may include transmitting segmentation information that indicates a plurality of slot segments within the slot and that indicates a skipping order for the plurality of slot segments. The method may include receiving a partial uplink transmission that includes a resource skipping in one or more slot segments of the plurality of slot segments in accordance with the segmentation information.

Some aspects described herein relate to a method of wireless communication performed by a network node. The method may include transmitting resource skipping information, associated with partial uplink transmissions in a full-duplex slot, that indicates a skipping order for a plurality of resources in an uplink portion of the full-duplex slot based at least in part on a proximity of the plurality of resources to a downlink portion of the full-duplex slot, and that indicates a granularity to be used for performing a resource skipping operation in accordance with the skipping order. The method may include receiving a partial uplink transmission that includes a resource skipping operation that is based at least in part on the resource skipping information.

Some aspects described herein relate to an apparatus for wireless communication performed by a UE. The apparatus may include a memory and one or more processors, coupled to the memory. The one or more processors may be configured to obtain slot information that indicates whether a slot is a half-duplex slot or a full-duplex slot and that indicates a frequency structure of the full-duplex slot. The one or more processors may be configured to receive segmentation information that indicates a plurality of slot segments within the slot and that indicates a skipping order for the plurality of slot segments. The one or more processors may be configured to initiate a partial uplink transmission. The one or more processors may be configured to perform resource skipping in one or more slot segments of the plurality of slot segments based at least in part on the slot information and the segmentation information.

Some aspects described herein relate to an apparatus for wireless communication performed by a UE. The apparatus may include a memory and one or more processors, coupled to the memory. The one or more processors may be configured to receive resource skipping information, associated with a partial uplink transmission in a full-duplex slot, that indicates a skipping order for a plurality of resources in an uplink portion of the full-duplex slot based at least in part on a proximity of the plurality of resources to a downlink portion of the full-duplex slot, and that indicates a granularity to be used for performing a resource skipping operation in accordance with the skipping order. The one or more processors may be configured to initiate the partial uplink transmission. The one or more processors may be configured to perform the resource skipping operation based at least in part on the resource skipping information.

Some aspects described herein relate to an apparatus for wireless communication performed by a network node. The apparatus may include a memory and one or more processors, coupled to the memory. The one or more processors may be configured to transmit slot information that indicates whether a slot is a half-duplex slot or a full-duplex slot and that indicates a frequency structure of the full-duplex slot. The one or more processors may be configured to transmit segmentation information that indicates a plurality of slot segments within the slot and that indicates a skipping order for the plurality of slot segments. The one or more processors may be configured to receive a partial uplink transmission that includes a resource skipping in one or more slot segments of the plurality of slot segments in accordance with the segmentation information.

Some aspects described herein relate to an apparatus for wireless communication performed by a network node. The apparatus may include a memory and one or more processors, coupled to the memory. The one or more processors may be configured to transmit resource skipping information, associated with partial uplink transmissions in a full-duplex slot, that indicates a skipping order for a plurality of resources in an uplink portion of the full-duplex slot based at least in part on a proximity of the plurality of resources to a downlink portion of the full-duplex slot, and that indicates a granularity to be used for performing a resource skipping operation in accordance with the skipping order. The one or more processors may be configured to receive a partial uplink transmission that includes a resource skipping operation that is based at least in part on the resource skipping information.

Some aspects described herein relate to a non-transitory computer-readable medium that stores a set of instructions for wireless communication by a UE. The set of instructions, when executed by one or more processors of the UE, may cause the UE to obtain slot information that indicates whether a slot is a half-duplex slot or a full-duplex slot and that indicates a frequency structure of the full-duplex slot. The set of instructions, when executed by one or more processors of the UE, may cause the UE to receive segmentation information that indicates a plurality of slot segments within the slot and that indicates a skipping order for the plurality of slot segments. The set of instructions, when executed by one or more processors of the UE, may cause the UE to initiate a partial uplink transmission. The set of instructions, when executed by one or more processors of the UE, may cause the UE to perform resource skipping in one or more slot segments of the plurality of slot segments based at least in part on the slot information and the segmentation information.

Some aspects described herein relate to a non-transitory computer-readable medium that stores a set of instructions for wireless communication by a UE. The set of instructions, when executed by one or more processors of the UE, may cause the UE to receive resource skipping information, associated with a partial uplink transmission in a full-duplex slot, that indicates a skipping order for a plurality of resources in an uplink portion of the full-duplex slot based at least in part on a proximity of the plurality of resources to a downlink portion of the full-duplex slot, and that indicates a granularity to be used for performing a resource skipping operation in accordance with the skipping order. The set of instructions, when executed by one or more processors of the UE, may cause the UE to initiate the partial uplink transmission. The set of instructions, when executed by one or more processors of the UE, may cause the UE to perform the resource skipping operation based at least in part on the resource skipping information.

Some aspects described herein relate to a non-transitory computer-readable medium that stores a set of instructions for wireless communication by a network node. The set of instructions, when executed by one or more processors of the network node, may cause the network node to transmit slot information that indicates whether a slot is a half-duplex slot or a full-duplex slot and that indicates a frequency structure of the full-duplex slot. The set of instructions, when executed by one or more processors of the network node, may cause the network node to transmit segmentation information that indicates a plurality of slot segments within the slot and that indicates a skipping order for the plurality of slot segments. The set of instructions, when executed by one or more processors of the network node, may cause the network node to receive a partial uplink transmission that includes a resource skipping in one or more slot segments of the plurality of slot segments in accordance with the segmentation information.

Some aspects described herein relate to a non-transitory computer-readable medium that stores a set of instructions for wireless communication by a network node. The set of instructions, when executed by one or more processors of the network node, may cause the network node to transmit resource skipping information, associated with partial uplink transmissions in a full-duplex slot, that indicates a skipping order for a plurality of resources in an uplink portion of the full-duplex slot based at least in part on a proximity of the plurality of resources to a downlink portion of the full-duplex slot, and that indicates a granularity to be used for performing a resource skipping operation in accordance with the skipping order. The set of instructions, when executed by one or more processors of the network node, may cause the network node to receive a partial uplink transmission that includes a resource skipping operation that is based at least in part on the resource skipping information.

Some aspects described herein relate to an apparatus for wireless communication. The apparatus may include means for obtaining slot information that indicates whether a slot is a half-duplex slot or a full-duplex slot and that indicates a frequency structure of the full-duplex slot. The apparatus may include means for receiving segmentation information that indicates a plurality of slot segments within the slot and that indicates a skipping order for the plurality of slot segments. The apparatus may include means for initiating a partial uplink transmission. The apparatus may include means for performing resource skipping in one or more slot segments of the plurality of slot segments based at least in part on the slot information and the segmentation information.

Some aspects described herein relate to an apparatus for wireless communication. The apparatus may include means for receiving resource skipping information, associated with a partial uplink transmission in a full-duplex slot, that indicates a skipping order for a plurality of resources in an uplink portion of the full-duplex slot based at least in part on a proximity of the plurality of resources to a downlink portion of the full-duplex slot, and that indicates a granularity to be used for performing a resource skipping operation in accordance with the skipping order. The apparatus may include means for initiating the partial uplink transmission. The apparatus may include means for performing the resource skipping operation based at least in part on the resource skipping information.

Some aspects described herein relate to an apparatus for wireless communication. The apparatus may include means for transmitting slot information that indicates whether a slot is a half-duplex slot or a full-duplex slot and that indicates a frequency structure of the full-duplex slot. The apparatus may include means for transmitting segmentation information that indicates a plurality of slot segments within the slot and that indicates a skipping order for the plurality of slot segments. The apparatus may include means for receiving a partial uplink transmission that includes a resource skipping in one or more slot segments of the plurality of slot segments in accordance with the segmentation information.

Some aspects described herein relate to an apparatus for wireless communication. The apparatus may include means for transmitting resource skipping information, associated with partial uplink transmissions in a full-duplex slot, that indicates a skipping order for a plurality of resources in an uplink portion of the full-duplex slot based at least in part on a proximity of the plurality of resources to a downlink portion of the full-duplex slot, and that indicates a granularity to be used for performing a resource skipping operation in accordance with the skipping order. The apparatus may include means for receiving a partial uplink transmission that includes a resource skipping operation that is based at least in part on the resource skipping information.

Aspects generally include a method, apparatus, system, computer program product, non-transitory computer-readable medium, user equipment, base station, network entity, network node, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating an example of partial uplink transmissions, in accordance with the present disclosure.

FIG. 8 is a diagram illustrating an example of full-duplex partial uplink transmissions, in accordance with the present disclosure.

FIG. 9 is a diagram illustrating an example of full-duplex partial uplink transmissions, in accordance with the present disclosure.

FIGS. 10A-10B are diagrams illustrating examples of resource skipping, in accordance with the present disclosure.

FIG. 12 is a diagram illustrating an example process performed, for example, by a UE, in accordance with the present disclosure.

FIG. 13 is a diagram illustrating an example process performed, for example, by a UE, in accordance with the present disclosure.

FIG. 14 is a diagram illustrating an example process performed, for example, by a network node, in accordance with the present disclosure.

FIG. 15 is a diagram illustrating an example process performed, for example, by a network node, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
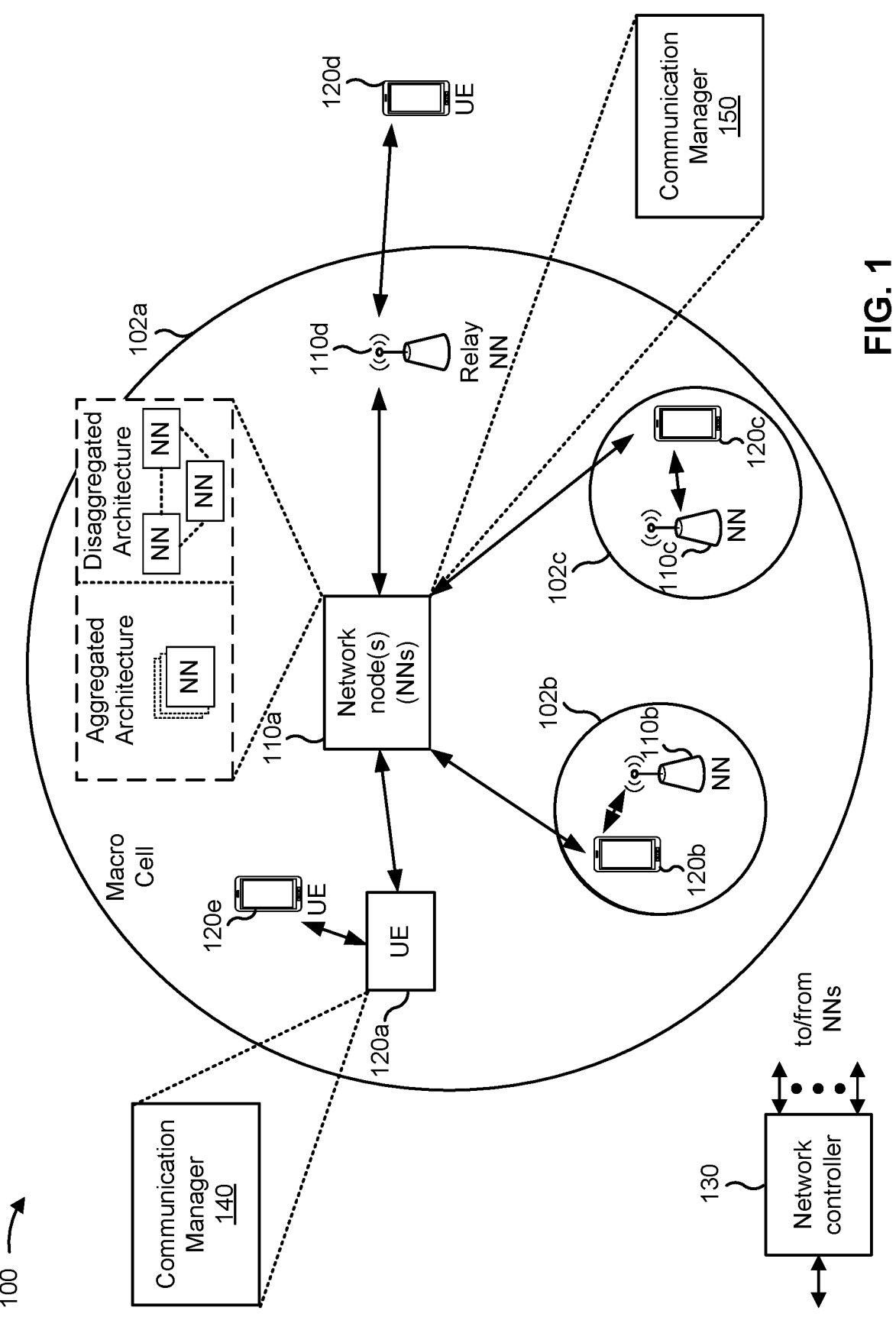
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may obtain slot information that indicates whether a slot is a half-duplex slot or a full-duplex slot and that indicates a frequency structure of the full-duplex slot; receive segmentation information that indicates a plurality of slot segments within the slot and that indicates a skipping order for the plurality of slot segments; initiate a partial uplink transmission; and perform resource skipping in one or more slot segments of the plurality of slot segments based at least in part on the slot information and the segmentation information.

In some aspects, the communication manager 140 may receive resource skipping information, associated with a partial uplink transmission in a full-duplex slot, that indicates a skipping order for a plurality of resources in an uplink portion of the full-duplex slot based at least in part on a proximity of the plurality of resources to a downlink portion of the full-duplex slot, and that indicates a granularity to be used for performing a resource skipping operation in accordance with the skipping order; initiate the partial uplink transmission; and perform the resource skipping operation based at least in part on the resource skipping information. Additionally, or alternatively, the communication manager 140 may perform one or more other operations described herein.

In some aspects, the network node 110 may include a communication manager 150. As described in more detail elsewhere herein, the communication manager 150 may transmit slot information that indicates whether a slot is a half-duplex slot or a full-duplex slot and that indicates a frequency structure of the full-duplex slot; transmit segmentation information that indicates a plurality of slot segments within the slot and that indicates a skipping order for the plurality of slot segments; and receive a partial uplink transmission that includes a resource skipping in one or more slot segments of the plurality of slot segments in accordance with the segmentation information.

In some aspects, the communication manager 150 may transmit resource skipping information, associated with partial uplink transmissions in a full-duplex slot, that indicates a skipping order for a plurality of resources in an uplink portion of the full-duplex slot based at least in part on a proximity of the plurality of resources to a downlink portion of the full-duplex slot, and that indicates a granularity to be used for performing a resource skipping operation in accordance with the skipping order; and receive a partial uplink transmission that includes a resource skipping operation that is based at least in part on the resource skipping information. Additionally, or alternatively, the communication manager 150 may perform one or more other operations described herein.

As indicated above, FIG. 1 is provided as an example. Other examples may differ from what is described with regard to FIG. 1.

Figure 2:
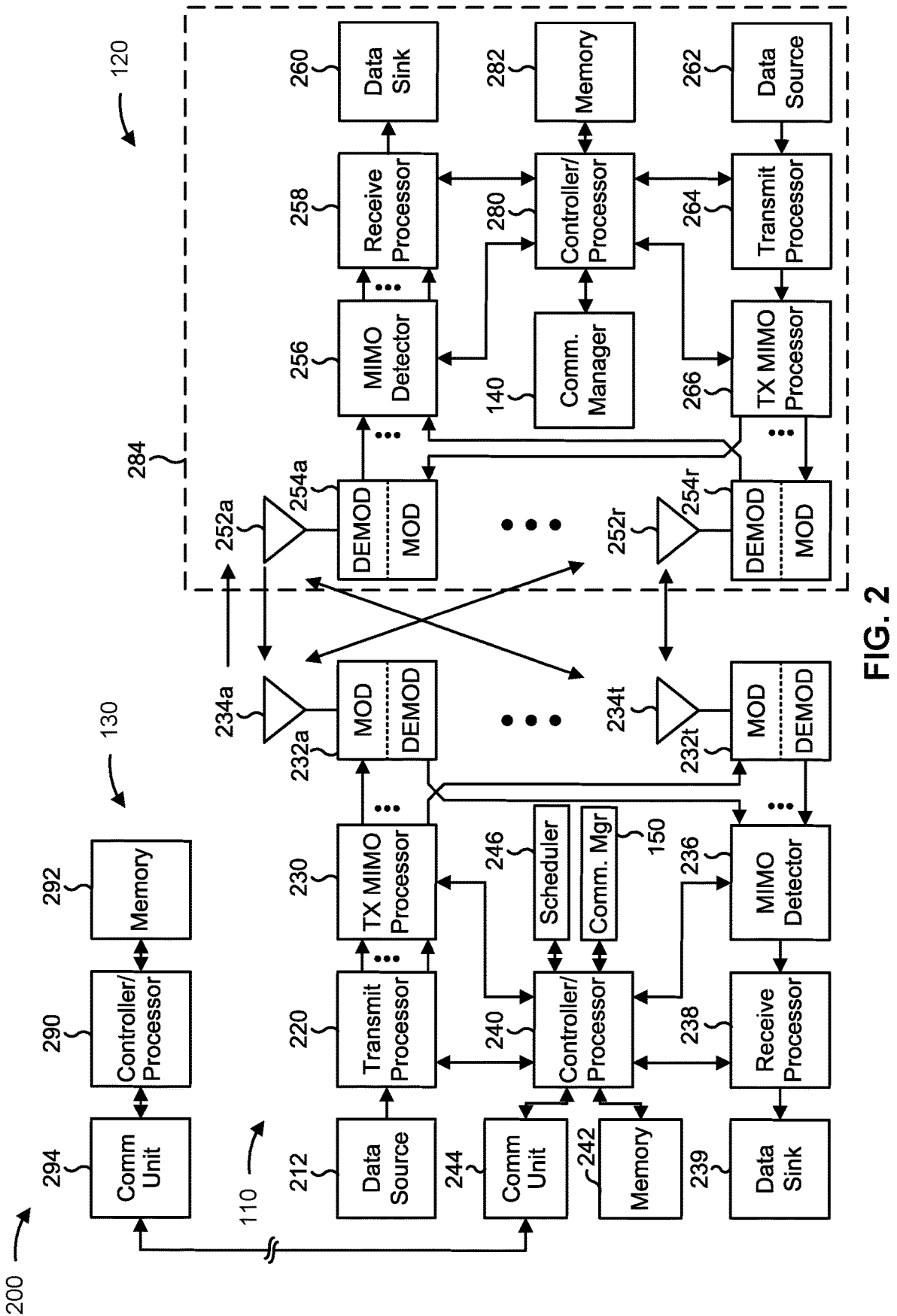
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 8-17).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 8-17).

The controller/processor 240 of the network node 110, the controller/processor 280 of the UE 120, and/or any other component(s) of FIG. 2 may perform one or more techniques associated with full-duplex partial uplink transmissions, as described in more detail elsewhere herein. For example, the controller/processor 240 of the network node 110, the controller/processor 280 of the UE 120, and/or any other component(s) of FIG. 2 may perform or direct operations of, for example, process 1200 of FIG. 12, process 1300 of FIG. 13, process 1400 of FIG. 14, process 1500 of FIG. 15, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1200 of FIG. 12, process 1300 of FIG. 13, process 1400 of FIG. 14, process 1500 of FIG. 15, and/or other processes as described herein. In some examples, executing instructions may include running the instructions, converting the instructions, compiling the instructions, and/or interpreting the instructions, among other examples.

In some aspects, the UE 120 includes means for obtaining slot information that indicates whether a slot is a half-duplex slot or a full-duplex slot and that indicates a frequency structure of the full-duplex slot; means for receiving segmentation information that indicates a plurality of slot segments within the slot and that indicates a skipping order for the plurality of slot segments; means for initiating a partial uplink transmission; and/or means for performing resource skipping in one or more slot segments of the plurality of slot segments based at least in part on the slot information and the segmentation information. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE 120 includes means for receiving resource skipping information, associated with a partial uplink transmission in a full-duplex slot, that indicates a skipping order for a plurality of resources in an uplink portion of the full-duplex slot based at least in part on a proximity of the plurality of resources to a downlink portion of the full-duplex slot, and that indicates a granularity to be used for performing a resource skipping operation in accordance with the skipping order; means for initiating the partial uplink transmission; and/or means for performing the resource skipping operation based at least in part on the resource skipping information. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting slot information that indicates whether a slot is a half-duplex slot or a full-duplex slot and that indicates a frequency structure of the full-duplex slot; means for transmitting segmentation information that indicates a plurality of slot segments within the slot and that indicates a skipping order for the plurality of slot segments; and/or means for receiving a partial uplink transmission that includes a resource skipping in one or more slot segments of the plurality of slot segments in accordance with the segmentation information. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the network node 110 includes means for transmitting resource skipping information, associated with partial uplink transmissions in a full-duplex slot, that indicates a skipping order for a plurality of resources in an uplink portion of the full-duplex slot based at least in part on a proximity of the plurality of resources to a downlink portion of the full-duplex slot, and that indicates a granularity to be used for performing a resource skipping operation in accordance with the skipping order; and/or means for receiving a partial uplink transmission that includes a resource skipping operation that is based at least in part on the resource skipping information. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
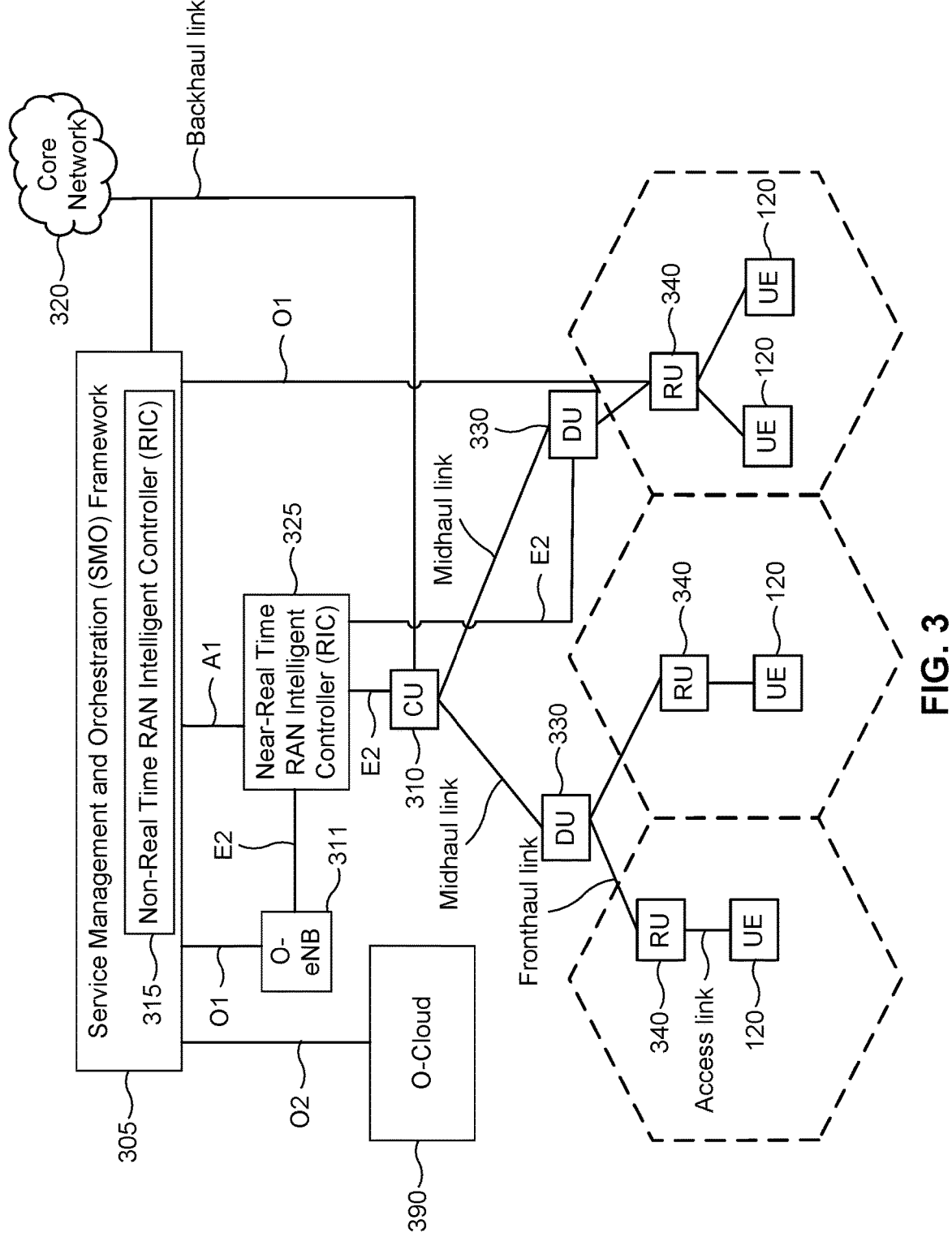
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an AI interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4B:
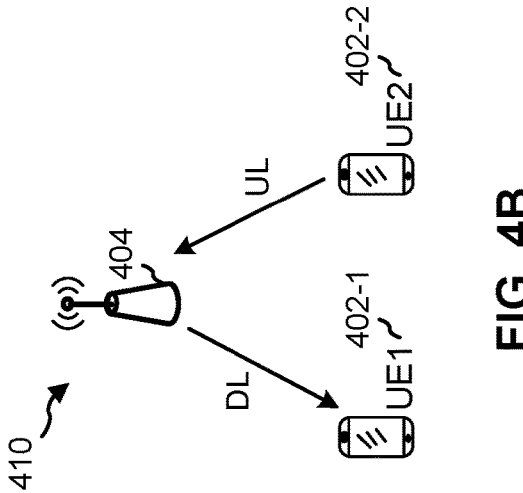
FIGS. 4A-4C are diagrams illustrating examples of full duplex communication in accordance with the present disclosure.
Figure 4C:
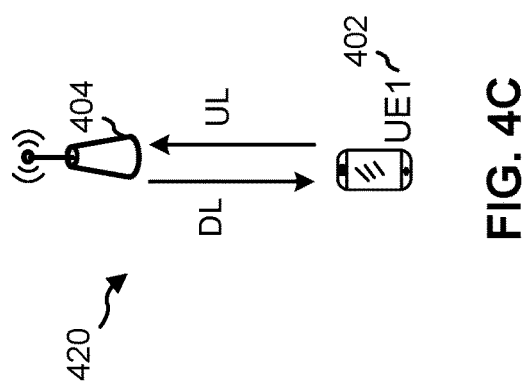
Figure 4A:
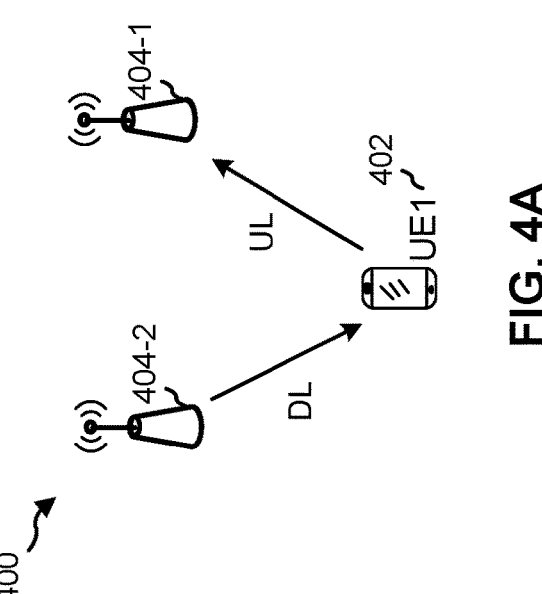

FIGS. 4A-4C are diagrams illustrating examples 400, 410, 420 of full duplex (FD) communication in accordance with the present disclosure. The example 400 of FIG. 4A includes a UE1 402 and two network nodes (e.g., TRPs) 404-1, 404-2, where the UE1 402 is sending UL transmissions to network node 404-1 and is receiving DL transmissions from network node 404-2. In the example 400 of FIG. 4A, FD is enabled for the UE 1402, but not for the network nodes 404-1, 404-2. The example 410 of FIG. 4B includes two UEs, shown as UE1 402-1 and UE2 402-2, and a network node 404, where the UE1 402-1 is receiving a DL transmission from the network node 404 and the UE2 402-2 is transmitting an UL transmission to the network node 404. In the example 410 of FIG. 4B, FD is enabled for the network node 404, but not for UE1 402-1 and UE2 402-2. The example 420 of FIG. 4C includes a UE1 402 and a network node 404, where the UE1 402 is receiving a DL transmission from the network node 404 and the UE1 402 is transmitting an UL transmission to the network node 404. In the example 420 of FIG. 4C, FD is enabled for both the UE1 402 and the network node 404.

As indicated above, FIGS. 4A-4C are provided as one or more examples. Other examples may differ from what is described with regard to FIGS. 4A-4C.

Figure 5:
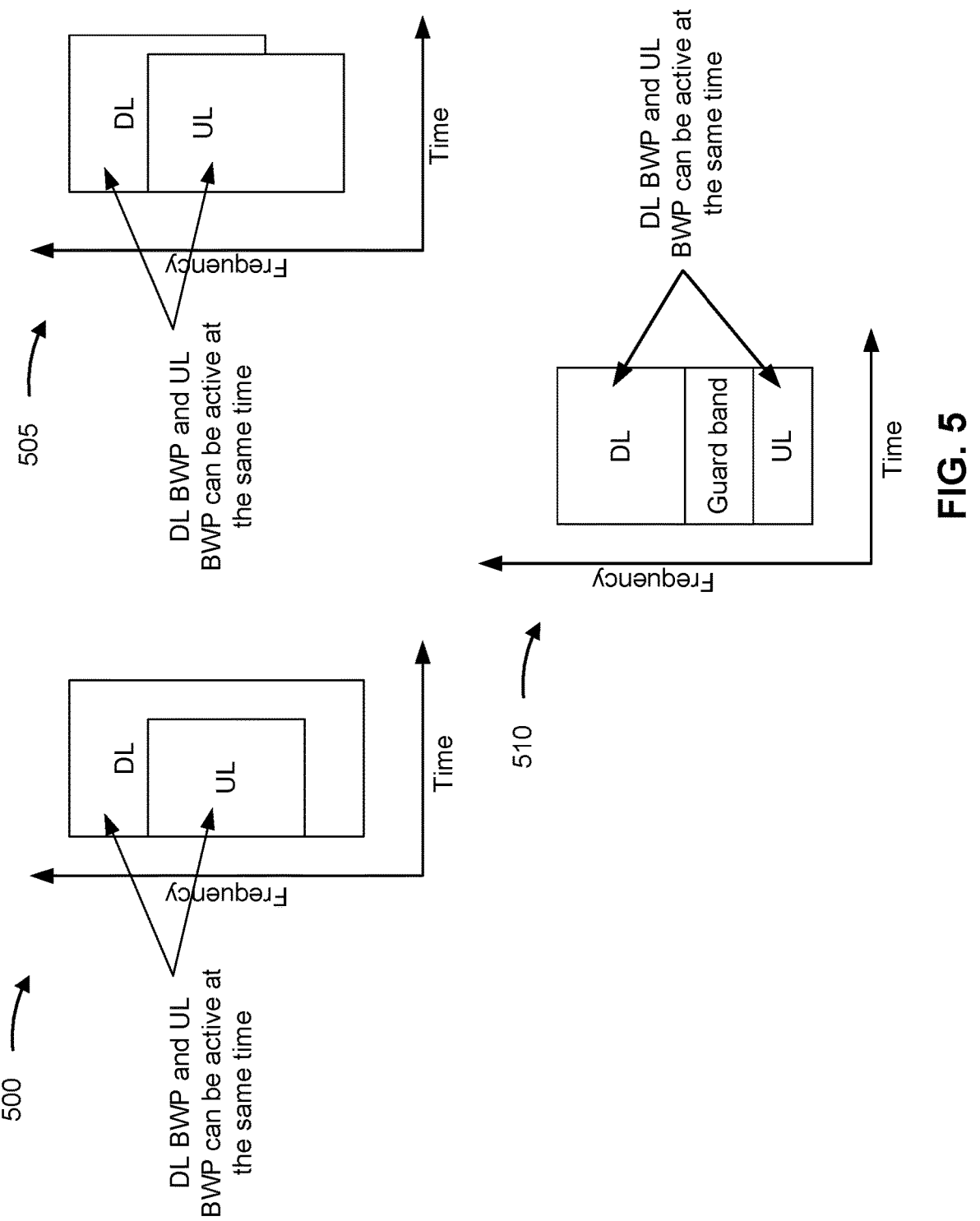
FIG. 5 is a diagram illustrating examples of full-duplex communication in a wireless network, in accordance with the present disclosure.

FIG. 5 is a diagram illustrating examples 500, 505, and 510 of full-duplex communication in a wireless network, in accordance with the present disclosure. "Full-duplex communication" in a wireless network refers to simultaneous bi-directional communication between devices in the wireless network. For example, a UE operating in a full-duplex mode may transmit an uplink communication and receive a downlink communication at the same time (e.g., in the same slot or the same symbol). "Half-duplex communication" in a wireless network refers to unidirectional communications (e.g., only downlink communication or only uplink communication) between devices at a given time (e.g., in a given slot or a given symbol).

As shown in FIG. 5, examples 500 and 505 show examples of in-band full-duplex (IBFD) communication. In IBFD, a UE may transmit an uplink communication to a network node and receive a downlink communication from the network node on the same time and frequency resources. As shown in example 500, in a first example of IBFD, the time and frequency resources for uplink communication may fully overlap with the time and frequency resources for downlink communication. As shown in example 505, in a second example of IBFD, the time and frequency resources for uplink communication may partially overlap with the time and frequency resources for downlink communication.

As further shown in FIG. 5, example 510 shows an example of sub-band full-duplex (SBFD) communication, which may also be referred to as "sub-band frequency division duplex (SBFDD)" or "flexible duplex." In SBFD, a UE may transmit an uplink communication to a network node and receive a downlink communication from the network node at the same time, but on different frequency resources. For example, the different frequency resources may be sub-bands of a frequency band, such as a time division duplexing band. In this case, the frequency resources used for downlink communication may be separated from the frequency resources used for uplink communication, in the frequency domain, by a guard band.

As indicated above, FIG. 5 is provided as an example. Other examples may differ from what is described with respect to FIG. 5.

Figure 6:
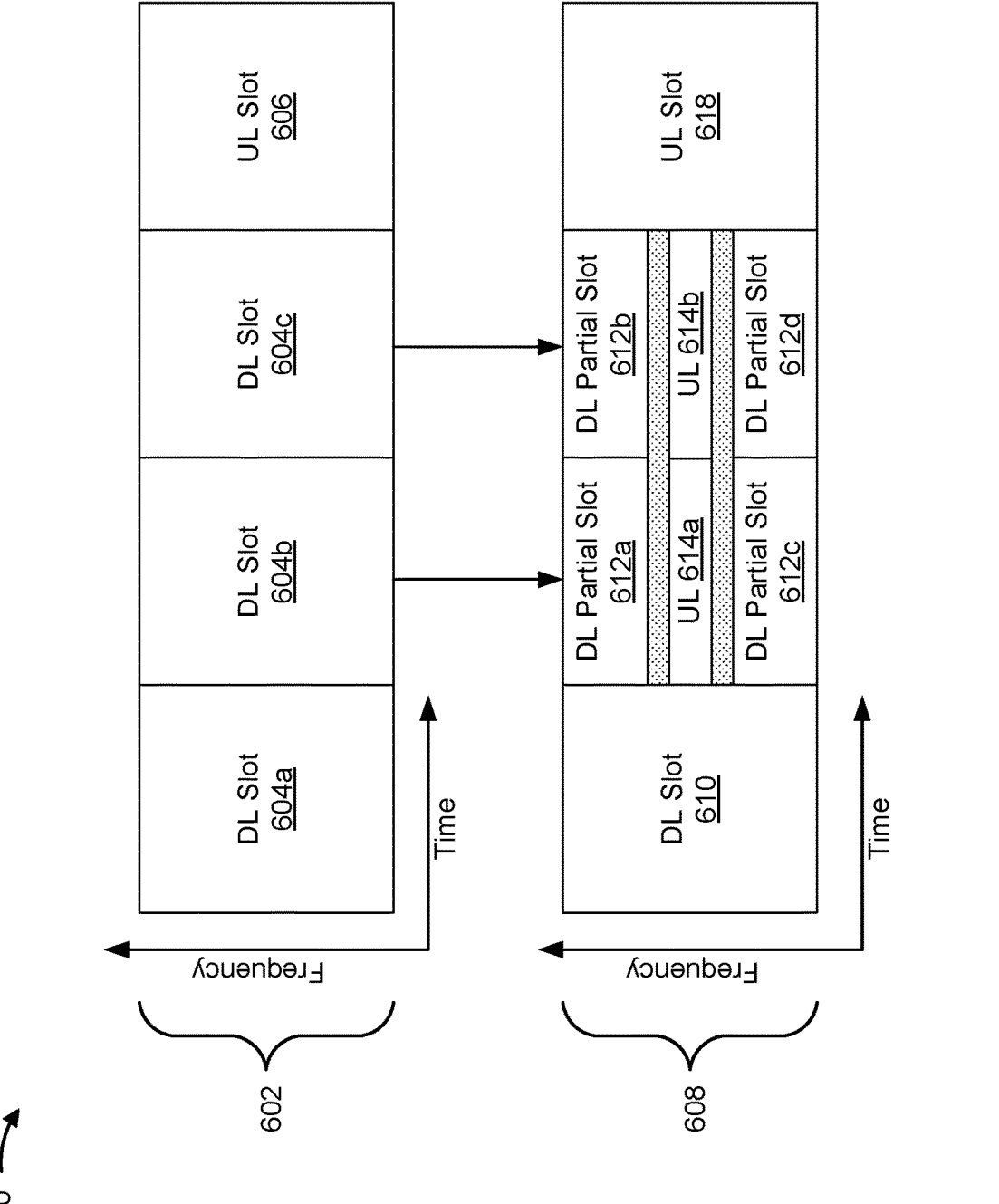
FIG. 6 is a diagram illustrating an example of sub-band full duplex activation, in accordance with the present disclosure.

FIG. 6 is a diagram illustrating an example 600 of sub-band full duplex (SBFD) activation, in accordance with the present disclosure. As shown in FIG. 6, example 600 includes a first configuration 602. In some aspects, the first configuration 602 may indicate a first slot format pattern (sometimes called a TDD pattern) associated with a half-duplex mode or a full-duplex mode. The first slot format pattern may include a quantity of downlink slots (e.g., three downlink slots 604a, 604b, and 604c, as shown), a quantity of flexible slots (not shown), and/or a quantity of uplink slots (e.g., one uplink slot 606, as shown). The first slot format pattern may repeat over time. In some aspects, a network node 110 may indicate the first slot format pattern to a UE 120 using one or more slot format indicators. A slot format indicator, for a slot, may indicate whether that slot is an uplink slot, a downlink slot, or a flexible slot, among other examples.

A network node 110 may instruct (e.g., using an indication, such as a radio resource control (RRC) message, a medium access control (MAC) control element (CE) (MAC-CE), or downlink control information (DCI)) a UE 120 to switch from the first configuration 602 to a second configuration 608. As an alternative, the UE 120 may indicate to the network node 110 that the UE 120 is switching from the first configuration 602 to the second configuration 608. The second configuration 608 may indicate a second slot format pattern that repeats over time, similar to the first slot format pattern. In any of the aspects described above, the UE 120 may switch from the first configuration 602 to the second configuration 608 during a time period (e.g., a quantity of symbols and/or an amount of time (e.g., in ms)) based at least in part on an indication received from the network node 110 (e.g., before switching back to the first configuration 602). During that time period, the UE 120 may communicate using the second slot format pattern, and then may revert to using the first slot format pattern after the end of the time period. The time period may be indicated by the network node 110 (e.g., in the instruction to switch from the first configuration 602 to the second configuration 608, as described above) and/or based at least in part on a programmed and/or otherwise preconfigured rule. For example, the rule may be based at least in part on a table (e.g., defined in 3GPP specifications and/or another wireless communication standard) that associates different sub-carrier spacings (SCSs) and/or numerologies (e.g., represented by μ and associated with corresponding SCSs) with corresponding time periods for switching configurations.

In example 600, the second slot format pattern includes two SBFD slots in place of what were downlink slots in the first slot format pattern. The second slot configuration may include a downlink slot 610 and an uplink slot 618. In example 600, each SBFD slot includes a partial slot (e.g., a portion or sub-band of a frequency allocated for use by the network node 110 and the UE 120) for downlink (e.g., partial slots 612a, 612b, 612c, and 612d, as shown) and a partial slot for uplink (e.g., partial slots 614a and 614b, as shown). Accordingly, the UE 120 may operate using the second slot format pattern to transmit an uplink communication in an earlier slot (e.g., the second slot in sequence, shown as partial UL slot 614a) as compared to using the first slot format pattern (e.g., the fourth slot in sequence, shown as UL slot 606). Other examples may include additional or alternative changes. For example, the second configuration 608 may indicate an SBFD slot in place of what was an uplink slot in the first configuration 602 (e.g., UL slot 606). In another example, the second configuration 608 may indicate a downlink slot or an uplink slot in place of what was an SBFD slot in the first configuration 602 (not shown in FIG. 6). In yet another example, the second configuration 608 may indicate a downlink slot or an uplink slot in place of what was an uplink slot or a downlink slot, respectively, in the first configuration 602. An "SBFD slot" may refer to a slot in which an SBFD format is used. An SBFD format may include a slot format in which full duplex communication is supported (e.g., for both uplink and downlink communications), with one or more frequencies used for an uplink portion of the slot being separated from one or more frequencies used for a downlink portion of the slot by a guard band. In some aspects, the SBFD format may include a single uplink portion and a single downlink portion separated by a guard band. In some aspects, the SBFD format may include multiple downlink portions and a single uplink portion that is separated from the multiple downlink portions by respective guard bands (e.g., as shown in FIG. 6). In some aspects, an SBFD format may include multiple uplink portions and a single downlink portion that is separated from the multiple uplink portions by respective guard bands. In some aspects, the SBFD format may include multiple uplink portions and multiple downlink portions, where each uplink portion is separated from a downlink portion by a guard band. In some aspects, operating using an SBFD mode may include activating or using an FD mode in one or more slots based at least in part on the one or more slots having the SBFD format. A slot may support the SBFD mode if an UL bandwidth part (BWP) and a DL BWP are permitted to be or are simultaneously active in the slot in an SBFD fashion (e.g., with guard band separation).

By switching from the first configuration 602 to the second configuration 608, the network node 110 and the UE 120 may experience increased quality and/or reliability of communications. For example, the network node 110 and the UE 120 may experience increased throughput (e.g., using a full-duplex mode), reduced latency (e.g., the UE 120 may be able to transmit an uplink and/or a downlink communication sooner using the second configuration 608 rather than the first configuration 602), and increased network resource utilization (e.g., by using both the DL BWP and the UL BWP simultaneously instead of only the DL BWP or the UL BWP).

In some cases, downlink and uplink transmissions may occur in overlapping bands (such as using in-band full-duplex) or in adjacent bands (such as using full-duplex). A half-duplex UE may either transmit in the uplink band or receive in the downlink band when using a downlink/uplink symbol. In contrast, a full-duplex UE may transmit in the uplink band and/or receive in the downlink band in the same slot when using a downlink/uplink symbol. A downlink/uplink slot may include only downlink symbols, only uplink symbols, or full-duplex symbols. In some cases, there may be interference between the partial slots. For example, there may be interference (as shown by the dotted shading) between the uplink partial slot 614a and the downlink partial slots 612a and 612c. Similarly, there may be interference between the uplink partial slot 614b and the downlink partial slots 612b and 612d.

As indicated above, FIG. 6 is provided as an example. Other examples may differ from what is described with respect to FIG. 6.

FIG. 7 is a diagram illustrating an example 700 of partial uplink transmissions, in accordance with the present disclosure. In some cases, a resource allocation may be over-allocated by the network node 110. This may occur, for example, when the network node 110 does not receive regular or periodic buffer status reports (BSRs). In this case, an amount of data to be transmitted by the UE 120 may be smaller than the resource allocation. When the UE 120 does not have enough data to fill the allocated resources, the UE 120 may pad one or more zeros to the transport block and may transmit the data (with the appended zeros) using the allocated resources. However, this may result in wasted network resources. In some other cases, the UE 120 may skip the entire transmission based at least in part on the UE 120 not having enough data to transmit in the allocated resources. This may also result in wasted network resources and may result in dropped transmissions.

In some cases, the UE 120 may perform a partial uplink transmission. The partial uplink transmission may include transmitting data in some of the allocated resources but not transmitting data in some others of the allocated resources. For example, the UE 120 may transmit data on a smaller set of allocated resources instead of appending bits to the data transmission to fit the initial resource allocation. In one example, the network node 110 may allocate physical uplink shared channel (PUSCH) 705 to be used by the UE 120. The UE 120 may skip a first set of resources 710 and a second set of resources 715 within the PUSCH 705. The UE 120 may perform a data transmission within the remaining resources. For example, the UE 120 may perform a transmission within the PUSCH utilized for medium access control (MAC) protocol data unit (PDU) transmissions 720.

In some cases, the UE 120 may experience cross-link interference (CLI). When neighboring network nodes 110 use different time division duplexing (TDD) configurations to communicate with multiple UEs 120, this may result in a downlink communication between a first network node 110-1 and a first UE 120-1 in a same transmission time interval (TTI) as an uplink communication between a second network node 110-2 and a second UE 120-2. These communications in different transmission directions (e.g., downlink vs. uplink) in the same TTI may interfere with one another, which may be referred to as CLI. For example, a downlink communication transmitted by the first network node 110-1 may be received by the second network node 110-2, and may interfere with reception, by the second network node 110-2, of an uplink communication from the second UE 120-2. This may be referred to as downlink-to-uplink (DL-to-UL) interference or network-node-to-network-node interference. In some cases, the uplink communication transmitted by the second UE 120-2 may be received by the first UE 120-1, and may interfere with reception, by the first UE 120-1, of the downlink communication from the first base station 110-1. This may be referred to as uplink-to-downlink (UL-to-DL) interference or UE-to-UE interference. This UE-to-UE interference may occur and/or may increase when the first UE 120-1 and the second UE 120-2 are in close proximity.

In some cases, CLI may result from an uplink transmission that occurs on a boundary between a downlink sub-band and an uplink sub-band in a full-duplex slot. When the UE 120 does not have enough data to transmit within the sub-bands, it may not be possible for the UE 120 to pad random bits to transmit on the boundary between the downlink sub-band and the uplink sub-band. Thus, the partial uplink transmission methods described above may not be feasible within the slot structure and overall nature of full-duplex transmissions. This may result in increased CLI occurrences.

Techniques and apparatuses are described herein for full-duplex partial uplink transmissions. In some aspects, a UE may obtain slot information that indicates whether a slot is a half-duplex slot or a full-duplex slot and that indicates a frequency structure of the full-duplex slot. The UE may receive segmentation information that indicates a plurality of slot segments within the slot and that indicates a skipping order for the plurality of slot segments. The UE may initiate a partial uplink transmission, and may perform resource skipping in one or more slot segments of the plurality of slot segments based at least in part on the slot information and the segmentation information. The segmentation information may be indicated per-grant, per-BWP, or per-sub-band. In some aspects, the UE may receive resource skipping information associated with a partial uplink transmission in a full-duplex slot. The resource skipping information may indicate a skipping order for a plurality of resources in an uplink portion of the full-duplex slot based at least in part on a proximity of the plurality of resources to a downlink portion of the full-duplex slot. The resource skipping information may indicate a granularity to be used for performing a resource skipping operation in accordance with the skipping order. The UE may initiate the partial uplink transmission and may perform the resource skipping operation based at least in part on the resource skipping information. As a result, slot information may be utilized to optimize the partial uplink transmission by considering the slot structure and expected CLI level when performing the partial uplink transmission. Additional details are described herein.

As indicated above, FIG. 7 is provided as an example. Other examples are possible and may differ from what was described with respect to FIG. 7.

FIG. 8 is a diagram illustrating an example 800 of full-duplex partial uplink transmissions, in accordance with the present disclosure.

As shown by reference number 805, the UE 120 may obtain slot information that indicates whether a slot is a half-duplex slot or a full-duplex slot. Additionally, or alternatively, the slot information may indicate a frequency structure of the full-duplex slot. In some aspects, the UE 120 may receive the slot information from the network node 110. In some other aspects, the UE 120 may be configured with at least a portion of the slot information.

As shown by reference number 810, the UE 120 may receive segmentation information that indicates a plurality of slot segments within the slot and that indicates a skipping order for the plurality of slot segments. The segmentation information may indicate that the slot is to be segmented into the plurality of slot segments. For example, the segmentation information may indicate that the slot is to be segmented into a number of slot segments, where each slot segment corresponds to a portion of the time and frequency resources included within the slot. In one example, a first slot segment may correspond to a first portion of the time and frequency resources within the slot, a second slot segment may correspond to a second portion of the time and frequency resources within the slot, a third slot segment may correspond to a third portion of the time and frequency resources within the slot, a fourth slot segment may correspond to a fourth portion of the time and frequency resources within the slot, and a fifth slot segment may correspond to a fifth portion of the time and frequency resources within the slot, where the first slot segment, second slot segment, third slot segment, fourth slot segment, and fifth slot segment are non-overlapping slot segments. The skipping order may indicate an order for which the slot segments (or resources within the slot segments) are to be skipped based at least in part on an overlap or a boundary, such as an overlap or a boundary between the slot segment and a downlink resource.

In some aspects, the segmentation information may be configured separately for the half-duplex slot and for the full-duplex slot. The segments may be configured differently for the half-duplex slot and the full-duplex slot based at least in part on the uplink grant being split into multiple slot segments and indicating an order of skipping. For example, the segmentation information may indicate to use a first number of slot segments or a first resource skipping order for the half-duplex slot and to use a second number of slot segments or a second resource skipping order for the full-duplex slot.

In some aspects, the segmentation of the slot into the plurality of slot segments may be indicated per-grant. For example, each uplink grant may include segmentation information that indicates the slot segments and an order of skipping for the slot segments. In this case, the dynamic indication may be used to determine how the segmentation of resources across the allocated resources is to be performed.

In some aspects, the segmentation of the slot into the plurality of slot segments may be indicated per-BWP. In a first example, the BWP may be within the uplink sub-band. In this example, the slot segments may be the same as the slot segments that are used in the BWP of the half-duplex slot (or may be a different segmentation). In a second example, the BWP may be larger than the uplink sub-band. In this example, the slot segments may be based at least in part on (e.g., may be defined by) the overlap between the BWP and the uplink sub-band. Additional details regarding these features are described in FIG. 10A.

In some aspects, the segmentation of the slot into the plurality of slot segments may be indicated per-sub-band. The sub-band may be divided into multiple segments, where each segment is associated with an order of dropping for the partial uplink transmissions. In some cases, there may be more than one sub-band within the same slot. For example, the slot may include two uplink sub-bands and a single downlink sub-band. In a first example, the segmentation may be performed over both of the uplink sub-bands (either jointly or independently). In a second example, the segmentation may be performed over a single uplink sub-band only. Additional details regarding these features are described in FIG. 10B.

As shown by reference number 815, the UE 120 may initiate a partial uplink transmission and may perform resource skipping in one or more slot segments of the plurality of slot segments based at least in part on the slot information and the segmentation information. For example, the UE 120 may skip one or more resources in a first slot segment based at least in part on an overlap between the resources in the first slot segment and a downlink sub-band or based at least in part on a proximity between the resources in the first slot segment and the downlink sub-band. The one or more resources that are skipped within the slot segment may be all of the resources within the slot segment or may be a portion of the resources within the slot segment.

Additionally, or alternatively, the UE 120 may skip one or more resources in a second slot segment based at least in part on an overlap between the resources in the second slot segment and a downlink sub-band or based at least in part on a proximity between the resources in the second slot segment and the downlink sub-band. The slot segments or the resources within the slot segments may be skipped based at least in part on the skipping order included in the segmentation information to avoid the overlap or proximity to the downlink sub-bands. This may reduce the likelihood of CLI occurrences.

As indicated above, FIG. 8 is provided as an example. Other examples are possible and may differ from what was described with respect to FIG. 8.

FIG. 9 is a diagram illustrating an example 900 of full-duplex partial uplink transmissions, in accordance with the present disclosure.

As shown by reference number 905, the UE 120 may receive resource skipping information associated with a partial uplink transmission in a full-duplex slot. The resource skipping information may indicate a skipping order for a plurality of resources in an uplink portion of the full-duplex slot based at least in part on a proximity of the plurality of resources to a downlink portion of the full-duplex slot. Additionally, the resource skipping information may indicate a granularity to be used for performing a resource skipping operation in accordance with the skipping order.

Resources to be skipped in a full-duplex slot and in the case of partial uplink transmissions may be configured based at least in part on a boundary (e.g., proximity) between the downlink sub-band and the uplink sub-band. In some aspects, the UE 120 may be configured with a granularity. For example, the UE 120 may receive or obtain RRC information that includes the granularity. The granularity may indicate a number of resources (e.g., resource blocks) that are to be skipped by the UE 120 for each resource skipping operation. The granularity may be indicated by N. In some aspects, the resource skipping operations may be performed on one or more levels. For example, the closest N resource blocks to the boundary between the downlink sub-band and the uplink sub-band may be skipped during a skipping operation. In some aspects, the number of levels may be based at least in part on the number of available bits at the UE 120. For example, the UE 120 may skip resource blocks (in intervals of N) until the available resources are just enough for the UE 120 to perform the uplink transmission. The N skipped resource blocks may be from one side of the uplink sub-band or may be from both sides of the uplink sub-band. For example, the N skipped resource blocks may be from one side of the uplink sub-band or may be from both sides of the uplink sub-band based at least in part on the slot structure or the RRC configuration. In some aspects, the resource skipping operation may be performed to maximize the guard-band between an uplink transmission (in the uplink sub-band) and the downlink sub-band.

As shown by reference number 910, the UE 120 may initiate the partial uplink transmission and may perform the resource skipping operation based at least in part on the resource skipping information. For example, the UE 120 may perform a first resource skipping operation based at least in part on a boundary between a first set of N resource blocks and a first downlink sub-band. Additionally, or alternatively, the UE 120 may perform a second resource skipping operation based at least in part on a boundary between a second set of N resource blocks and a second downlink sub-band. In some aspects, the first resource skipping operation and the second resource skipping operation may be the same resource skipping operation. For example, the UE 120 may perform a resource skipping operation that includes skipping the first set of N resource blocks based at least in part on the proximity to the first downlink sub-band and skipping the second set of N resource blocks based at least in part on the proximity to the second downlink sub-band. In some other aspects, the UE 120 may only perform resource skipping for some of the resource blocks, such as the resource blocks having the boundary with the first downlink sub-band or the resource blocks having the boundary with the second downlink some-band. In some aspects, the UE 120 may perform another resource skipping operation that includes skipping another set (or multiple sets) of N resource blocks based at least in part on the boundary between the resource blocks and the downlink sub-bands. The UE 120 may perform any number of skipping operations as long as the UE 120 keeps enough available resources for performing the partial uplink transmission. Additional details are described in FIG. 11.

As indicated above, FIG. 9 is provided as an example. Other examples are possible and may differ from what was described with respect to FIG. 9.

Figure 10B:
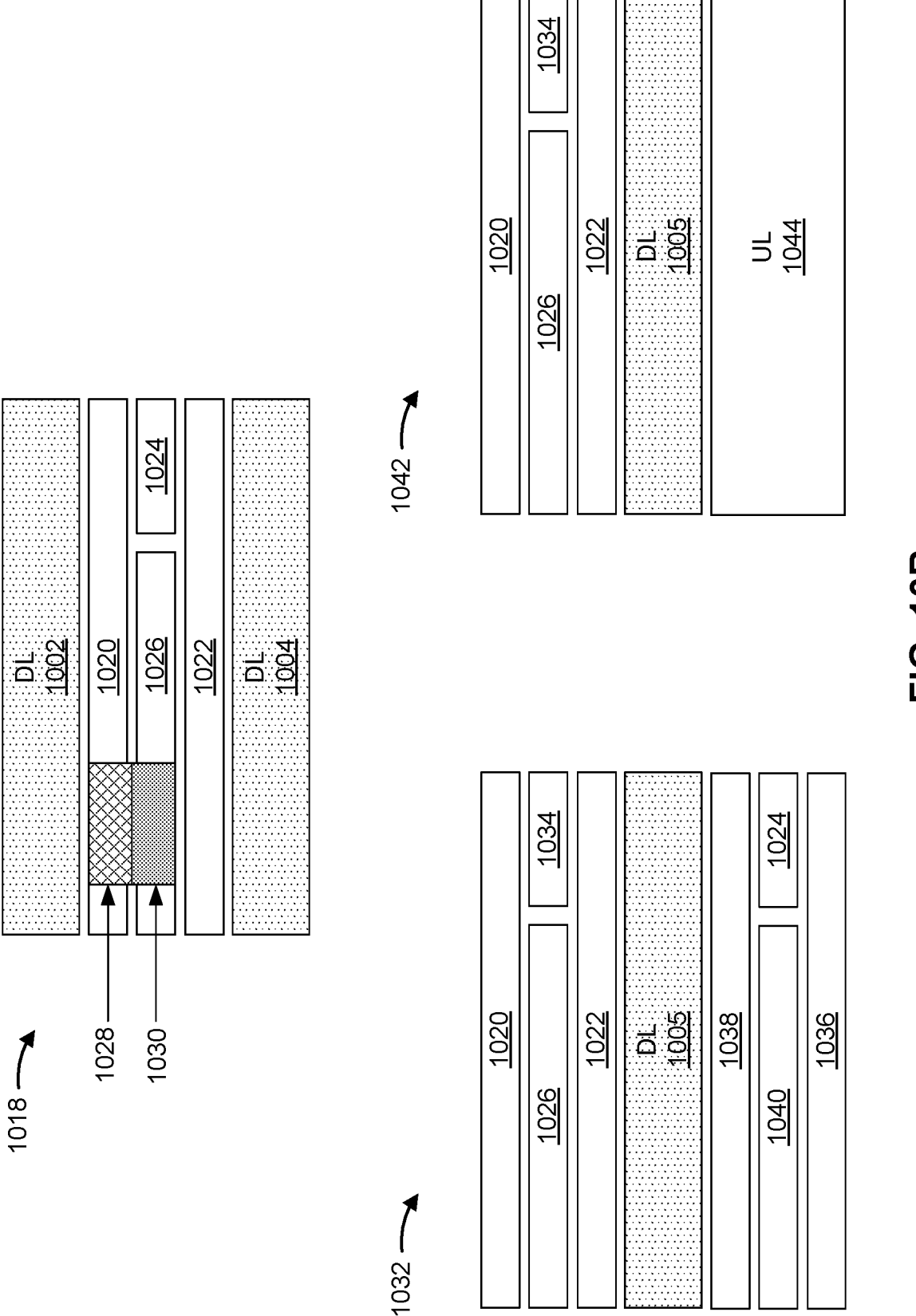

FIGS. 10A-10B are diagrams illustrating examples of resource skipping, in accordance with the present disclosure.

In some aspects, segmentation of a slot into a plurality of slot segments may be indicated per-BWP. As shown in FIG. 10A and by reference number 1000, the BWP may be within an uplink sub-band. In this case, the segmentation of the slots into the plurality of slot segments may be based at least in part on the segmentation of the BWP in the half-duplex slot. For example, the segmentation of the slots into the plurality of slot segments may the same as the segmentation of the BWP in the half-duplex slot. In one example, a slot may include a first downlink portion 1002, a second downlink portion 1004, and a plurality of slot segments associated with an uplink portion, such as a first slot segment 1006, a second slot segment 1008, a third slot segment 1010, a fourth slot segment 1012, and a fifth slot segment 1014. One or more slot segments (or certain resources within the one or more slot segments) may be skipped based at least in part on the order of the segments. For example, the UE 120 may skip slot segment 1006 (or one or more resources within slot segment 1006), then may skip slot segment 1008 (or one or more resources within slot segment 1008), then may skip slot segment 1010 (or one or more resources within slot segment 1010), then may skip slot segment 1012 (or one or more resources within slot segment 1012), and then may skip slot segment 1014 (or one or more resources within slot segment 1014). The UE 120 may skip one or more of the slot segments based at least in part on a boundary between the slot segments and a downlink sub-band. For example, the UE 120 may skip slot segment 1006 (one or more resources within slot segment 1006) based at least in part on the proximity between slot segment 1006 and the downlink portion 1002 and/or may skip slot segment 1014 (or one or more resources within slot segment 1014) based at least in part on the proximity between slot segment 1014 and the downlink portion 1004. The UE 120 may not skip slot segment 1008 or slot segment 1010.

In some other aspects, as shown by reference number 1016, the BWP may be larger than the uplink sub-band. In this case, the segmentation of the slot into the plurality of slot segments may be based at least in part on the overlap between the BWP and the uplink sub-band. For example, the UE 120 may skip resources within slot segment 1006 that overlap with (or are in proximity to) the downlink portion 1002. Next, the UE 120 may skip resources within slot segment 1008 that overlap with (or are in proximity to) the downlink portion 1004. Next, the UE 120 may skip resources within slot segment 1010 that overlap with (or are in proximity to) the downlink portion 1004. Next, the UE 120 may skip resources within slot segment 1012 that overlap with (or are in proximity to) the downlink portion 1002 or the downlink portion 1004. Next, the UE 120 may skip resources within slot segment 1014 that overlap with (or are in proximity to) the downlink portion 1004. For example, the UE 120 may skip the entirety of slot segment 1014 based at least in part on a complete overlap between the slot segment 1014 and the downlink portion 1004.

In some aspects, the segmentation of the slot into the plurality of slot segments may be indicated per sub-band. As shown in FIG. 10B and by reference number 1018, an uplink sub-band may include slot segment 1020, slot segment 1022, slot segment 1024, and slot segment 1026. The UE 120 may receive an uplink grant that is shown by reference numbers 1028 and 1030. The UE 120 may skip the portion of the uplink grant 1028 (within slot segment 1020) based at least in part on the portion of the uplink grant 1028 being in proximity to the downlink portion 1002. The UE 120 may transmit in the portion of the uplink grant 1030 (within slot segment 1026) that is not in proximity to the downlink portion 1002 or the downlink portion 1004.

In some aspects, as shown by reference number 1032, the segmentation may be performed over all sub-bands jointly or independently. For example, a first uplink portion may include slot segment 1020, slot segment 1022, slot segment 1026, and slot segment 1034, and a second uplink portion may include slot segment 1024, slot segment 1036, slot segment 1038, and slot segment 1040. The UE 120 may jointly perform the slot segment skipping based at least in part on skipping corresponding segments within the uplink portions. For example, the UE 120 may skip slot segment 1022 and slot segment 1036 based at least in part on the proximity of slot segment 1022 to the downlink portion 1005 and based at least in part on slot segment 1036 corresponding to slot segment 1022 in the second uplink portion. In another example, the UE 120 may independently perform the slot segment skipping. For example, the UE 120 may skip slot segment 1022 without skipping corresponding slot segment 1036, and/or may skip slot segment 1038 without skipping corresponding slot segment 1020, based at least in part on the slot segments 1022 and 1038 having a boundary with the downlink portion 1005.

In some aspects, as shown by reference number 1042, the segmentation may be performed over a single sub-band only. For example, the UE 120 may perform slot segment skipping for slot segment 1020, slot segment 1022, slot segment 1026, and slot segment 1034 associated with a first uplink portion. However, the UE 120 may not perform slot segment skipping within a second uplink portion (such as uplink portion 1044).

As indicated above, FIGS. 10A-10B are provided as examples. Other examples are possible and may differ from what was described with respect to FIGS. 10A-10B.

Figure 11:
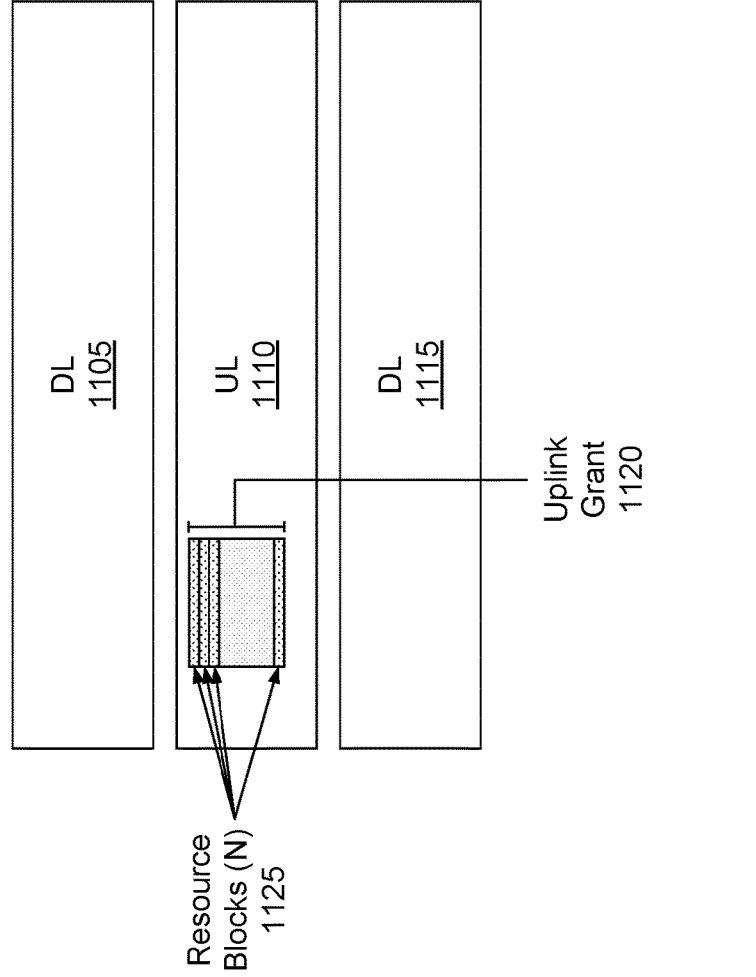
FIG. 11 is a diagram illustrating an example of resource skipping, in accordance with the present disclosure.

FIG. 11 is a diagram illustrating an example 1100 of resource skipping, in accordance with the present disclosure.

As described herein, the UE 120 may receive resource skipping information that indicates a skipping order for a plurality of resources in an uplink portion of a full-duplex slot based at least in part on a proximity of the plurality of resources to a downlink portion of the full-duplex slot. Additionally, the resource skipping information may indicate a granularity to be used for performing a resource skipping operation in accordance with the skipping order. The granularity may indicate a number of resource blocks N that are to be skipped by the UE 120 during each resource skipping operation.

A full-duplex slot may include a downlink portion 1105, an uplink portion 1110, and a downlink portion 1115. The UE 120 may be configured to perform an uplink transmission within an uplink grant 1120. However, the data to be transmitted by the UE 120 may need fewer resources than the number of resources that are allocated within the uplink grant 1120. In this case, the UE 120 may perform a skipping operation (or multiple skipping operations) in intervals of N resource blocks 1125 to reduce a likelihood of CLI with the downlink portion 1105 and/or the downlink portion 1115. In one example, the skipping operation may include skipping a set of N resource blocks 1125 from one side of the uplink portion 1110. For example, the UE 120 may skip the set of N resource blocks closest to the downlink portion 1105. In another example, the skipping operation may include skipping sets of N resource blocks 1125 from both sides of the uplink portion 1110. For example, the UE 120 may skip a set of N resource blocks closest to the downlink portion 1105 and another set of N resource blocks closest to the downlink portion 1115. The UE 120 may perform any number of skipping operations. For example, the resource skipping operation(s) may be performed to maximize the guard-band between an uplink transmission (in the uplink portion 1110) and the downlink portions 1105 and 1115.

As indicated above, FIG. 11 is provided as an example. Other examples are possible and may differ from what was described with respect to FIG. 11.

FIG. 12 is a diagram illustrating an example process 1200 performed, for example, by a UE, in accordance with the present disclosure. Example process 1200 is an example where the UE (e.g., UE 120) performs operations associated with full-duplex partial uplink transmissions.

As shown in FIG. 12, in some aspects, process 1200 may include obtaining slot information that indicates whether a slot is a half-duplex slot or a full-duplex slot and that indicates a frequency structure of the full-duplex slot (block 1210). For example, the UE (e.g., using communication manager 140 and/or obtaining component 1608, depicted in FIG. 16) may obtain slot information that indicates whether a slot is a half-duplex slot or a full-duplex slot and that indicates a frequency structure of the full-duplex slot, as described above.

As further shown in FIG. 12, in some aspects, process 1200 may include receiving segmentation information that indicates a plurality of slot segments within the slot and that indicates a skipping order for the plurality of slot segments (block 1220). For example, the UE (e.g., using communication manager 140 and/or reception component 1602, depicted in FIG. 16) may receive segmentation information that indicates a plurality of slot segments within the slot and that indicates a skipping order for the plurality of slot segments, as described above.

As further shown in FIG. 12, in some aspects, process 1200 may include initiating a partial uplink transmission (block 1230). For example, the UE (e.g., using communication manager 140 and/or initiating component 1610, depicted in FIG. 16) may initiate a partial uplink transmission, as described above.

As further shown in FIG. 12, in some aspects, process 1200 may include performing resource skipping in one or more slot segments of the plurality of slot segments based at least in part on the slot information and the segmentation information (block 1240). For example, the UE (e.g., using communication manager 140 and/or skipping component 1612, depicted in FIG. 16) may perform resource skipping in one or more slot segments of the plurality of slot segments based at least in part on the slot information and the segmentation information, as described above.

Process 1200 may include additional aspects, such as any single aspect or any combination of aspects described below and/or in connection with one or more other processes described elsewhere herein.

In a first aspect, the segmentation information is configured separately for the half-duplex slot and for the full-duplex slot.

In a second aspect, alone or in combination with the first aspect, the segmentation information is associated with an uplink grant and indicates to use a first number of slot segments or a first resource skipping order for the half-duplex slot and to use a second number of slot segments or a second resource skipping order for the full-duplex slot.

In a third aspect, alone or in combination with one or more of the first and second aspects, performing the resource skipping comprises skipping an entirety of a slot segment based at least in part on a complete overlap between the slot segment and a downlink resource.

In a fourth aspect, alone or in combination with one or more of the first through third aspects, performing the resource skipping comprises skipping a portion of a slot segment based at least in part on a partial overlap between the slot segment and a downlink resource.

In a fifth aspect, alone or in combination with one or more of the first through fourth aspects, the segmentation information is indicated per-grant, and the plurality of slot segments within the slot are based at least in part on a dynamic indication.

In a sixth aspect, alone or in combination with one or more of the first through fifth aspects, the segmentation information is indicated per-bandwidth part of a plurality of bandwidth parts.

In a seventh aspect, alone or in combination with one or more of the first through sixth aspects, a segmentation of the slot into the plurality of slot segments uses a same segmentation as the bandwidth part in the half-duplex slot, or uses a different segmentation, based at least in part on the bandwidth part being within an uplink sub-band.

In an eighth aspect, alone or in combination with one or more of the first through seventh aspects, a segmentation of the slot into the plurality of slot segments is defined by an overlap between the bandwidth part and an uplink sub-band based at least in part on the bandwidth part being larger than the uplink sub-band.

In a ninth aspect, alone or in combination with one or more of the first through eighth aspects, the segmentation information is indicated per sub-band of a plurality of sub-bands and each sub-band of the plurality of sub-bands is divided into a plurality of segments, wherein each segment is associated with a skipping order for skipping partial uplink transmissions.

In a tenth aspect, alone or in combination with one or more of the first through ninth aspects, the slot includes a plurality of sub-bands, and a segmentation of the slot into the plurality of slot segments is performed over all sub-bands of the plurality of sub-bands jointly or independently.

In an eleventh aspect, alone or in combination with one or more of the first through tenth aspects, the slot includes a plurality of sub-bands, and a segmentation of the slot into the plurality of slot segments is performed in only one sub-band of the plurality of sub-bands.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

FIG. 13 is a diagram illustrating an example process 1300 performed, for example, by a UE, in accordance with the present disclosure. Example process 1300 is an example where the UE (e.g., UE 120) performs operations associated with full-duplex partial uplink transmissions.

As shown in FIG. 13, in some aspects, process 1300 may include receiving resource skipping information, associated with a partial uplink transmission in a full-duplex slot, that indicates a skipping order for a plurality of resources in an uplink portion of the full-duplex slot based at least in part on a proximity of the plurality of resources to a downlink portion of the full-duplex slot, and that indicates a granularity to be used for performing a resource skipping operation in accordance with the skipping order (block 1310). For example, the UE (e.g., using communication manager 140 and/or reception component 1602, depicted in FIG. 16) may receive resource skipping information, associated with a partial uplink transmission in a full-duplex slot, that indicates a skipping order for a plurality of resources in an uplink portion of the full-duplex slot based at least in part on a proximity of the plurality of resources to a downlink portion of the full-duplex slot, and that indicates a granularity to be used for performing a resource skipping operation in accordance with the skipping order, as described above.

As further shown in FIG. 13, in some aspects, process 1300 may include initiating the partial uplink transmission (block 1320). For example, the UE (e.g., using communication manager 140 and/or initiating component 1610, depicted in FIG. 16) may initiate the partial uplink transmission, as described above.

As further shown in FIG. 13, in some aspects, process 1300 may include performing the resource skipping operation based at least in part on the resource skipping information (block 1330). For example, the UE (e.g., using communication manager 140 and/or skipping component 1612, depicted in FIG. 16) may perform the resource skipping operation based at least in part on the resource skipping information, as described above.

Process 1300 may include additional aspects, such as any single aspect or any combination of aspects described below and/or in connection with one or more other processes described elsewhere herein.

In a first aspect, the granularity indicates a number of resource blocks that are to be skipped for each resource skipping operation.

In a second aspect, alone or in combination with the first aspect, the granularity is based at least in part on a radio resource control configuration of the UE.

In a third aspect, alone or in combination with one or more of the first and second aspects, performing the resource skipping operation comprises skipping a number of resources of the plurality of resources based at least in part on the granularity and based at least in part on the number of resources being closer to the downlink portion of the full-duplex slot than a remainder of resources of the plurality of resources are to the downlink portion of the full-duplex slot.

In a fourth aspect, alone or in combination with one or more of the first through third aspects, performing the resource skipping operation comprises performing the resource skipping operation on one or more levels of the uplink portion of the full-duplex slot based at least in part on the granularity.

In a fifth aspect, alone or in combination with one or more of the first through fourth aspects, the one or more levels are based at least in part on a number of available bits at the UE for performing the partial uplink transmission.

In a sixth aspect, alone or in combination with one or more of the first through fifth aspects, performing the resource skipping operation comprises skipping one or more resources on a single side of the uplink portion of the full-duplex slot based at least in part on a slot structure or radio resource control configuration information.

In a seventh aspect, alone or in combination with one or more of the first through sixth aspects, performing the resource skipping operation comprises skipping one or more resources on both sides of the uplink portion of the full-duplex slot based at least in part on a slot structure or radio resource control configuration information.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

FIG. 14 is a diagram illustrating an example process 1400 performed, for example, by a network node, in accordance with the present disclosure. Example process 1400 is an example where the network node (e.g., network node 110) performs operations associated with full-duplex partial uplink transmissions.

As shown in FIG. 14, in some aspects, process 1400 may include transmitting slot information that indicates whether a slot is a half-duplex slot or a full-duplex slot and that indicates a frequency structure of the full-duplex slot (block 1410). For example, the network node (e.g., using communication manager 150 and/or transmission component 1704, depicted in FIG. 17) may transmit slot information that indicates whether a slot is a half-duplex slot or a full-duplex slot and that indicates a frequency structure of the full-duplex slot, as described above.

As further shown in FIG. 14, in some aspects, process 1400 may include transmitting segmentation information that indicates a plurality of slot segments within the slot and that indicates a skipping order for the plurality of slot segments (block 1420). For example, the network node (e.g., using communication manager 150 and/or transmission component 1704, depicted in FIG. 17) may transmit segmentation information that indicates a plurality of slot segments within the slot and that indicates a skipping order for the plurality of slot segments, as described above.

As further shown in FIG. 14, in some aspects, process 1400 may include receiving a partial uplink transmission that includes a resource skipping in one or more slot segments of the plurality of slot segments in accordance with the segmentation information (block 1430). For example, the network node (e.g., using communication manager 150 and/or reception component 1702, depicted in FIG. 17) may receive a partial uplink transmission that includes a resource skipping in one or more slot segments of the plurality of slot segments in accordance with the segmentation information, as described above.

Process 1400 may include additional aspects, such as any single aspect or any combination of aspects described below and/or in connection with one or more other processes described elsewhere herein.

In a first aspect, the segmentation information is indicated per-grant, and the plurality of slot segments within the slot are based at least in part on a dynamic indication.

In a second aspect, alone or in combination with the first aspect, the segmentation information is indicated per-bandwidth part of a plurality of bandwidth parts.

In a third aspect, alone or in combination with one or more of the first and second aspects, a segmentation of the slot into the plurality of slot segments uses a same segmentation as the bandwidth part in the half-duplex slot based at least in part on the bandwidth part being within an uplink sub-band, or is defined by an overlap between the bandwidth part and an uplink sub-band based at least in part on the bandwidth part being larger than the uplink sub-band.

In a fourth aspect, alone or in combination with one or more of the first through third aspects, the segmentation information is indicated per sub-band of a plurality of sub-bands and each sub-band of the plurality of sub-bands is divided into a plurality of segments, wherein each segment is associated with a skipping order for skipping partial uplink transmissions.

In a fifth aspect, alone or in combination with one or more of the first through fourth aspects, the slot includes a plurality of sub-bands, and a segmentation of the slot into the plurality of slot segments is performed over all sub-bands of the plurality of sub-bands, or in only one sub-band of the plurality of sub-bands.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

FIG. 15 is a diagram illustrating an example process 1500 performed, for example, by a network node, in accordance with the present disclosure. Example process 1500 is an example where the network node (e.g., network node 110) performs operations associated with full-duplex partial uplink transmissions.

As shown in FIG. 15, in some aspects, process 1500 may include transmitting resource skipping information, associated with partial uplink transmissions in a full-duplex slot, that indicates a skipping order for a plurality of resources in an uplink portion of the full-duplex slot based at least in part on a proximity of the plurality of resources to a downlink portion of the full-duplex slot, and that indicates a granularity to be used for performing a resource skipping operation in accordance with the skipping order (block 1510). For example, the network node (e.g., using communication manager 150 and/or transmission component 1704, depicted in FIG. 17) may transmit resource skipping information, associated with partial uplink transmissions in a full-duplex slot, that indicates a skipping order for a plurality of resources in an uplink portion of the full-duplex slot based at least in part on a proximity of the plurality of resources to a downlink portion of the full-duplex slot, and that indicates a granularity to be used for performing a resource skipping operation in accordance with the skipping order, as described above.

As further shown in FIG. 15, in some aspects, process 1500 may include receiving a partial uplink transmission that includes a resource skipping operation that is based at least in part on the resource skipping information (block 1520). For example, the network node (e.g., using communication manager 150 and/or reception component 1702, depicted in FIG. 17) may receive a partial uplink transmission that includes a resource skipping operation that is based at least in part on the resource skipping information, as described above.

Process 1500 may include additional aspects, such as any single aspect or any combination of aspects described below and/or in connection with one or more other processes described elsewhere herein.

In a first aspect, the granularity indicates a number of resource blocks that are to be skipped for each resource skipping operation.

In a second aspect, alone or in combination with the first aspect, the resource skipping operation comprises a skipping of one or more levels of the uplink portion of the full-duplex slot based at least in part on the granularity, wherein the one or more levels are based at least in part on a number of available bits that are available for the partial uplink transmission.

In a third aspect, alone or in combination with one or more of the first and second aspects, the resource skipping operation comprises a skipping of one or more resources on a single side of the uplink portion of the full-duplex slot, or a skipping of one or more resources on both sides of the uplink portion of the full-duplex slot, based at least in part on a slot structure or radio resource control configuration information.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
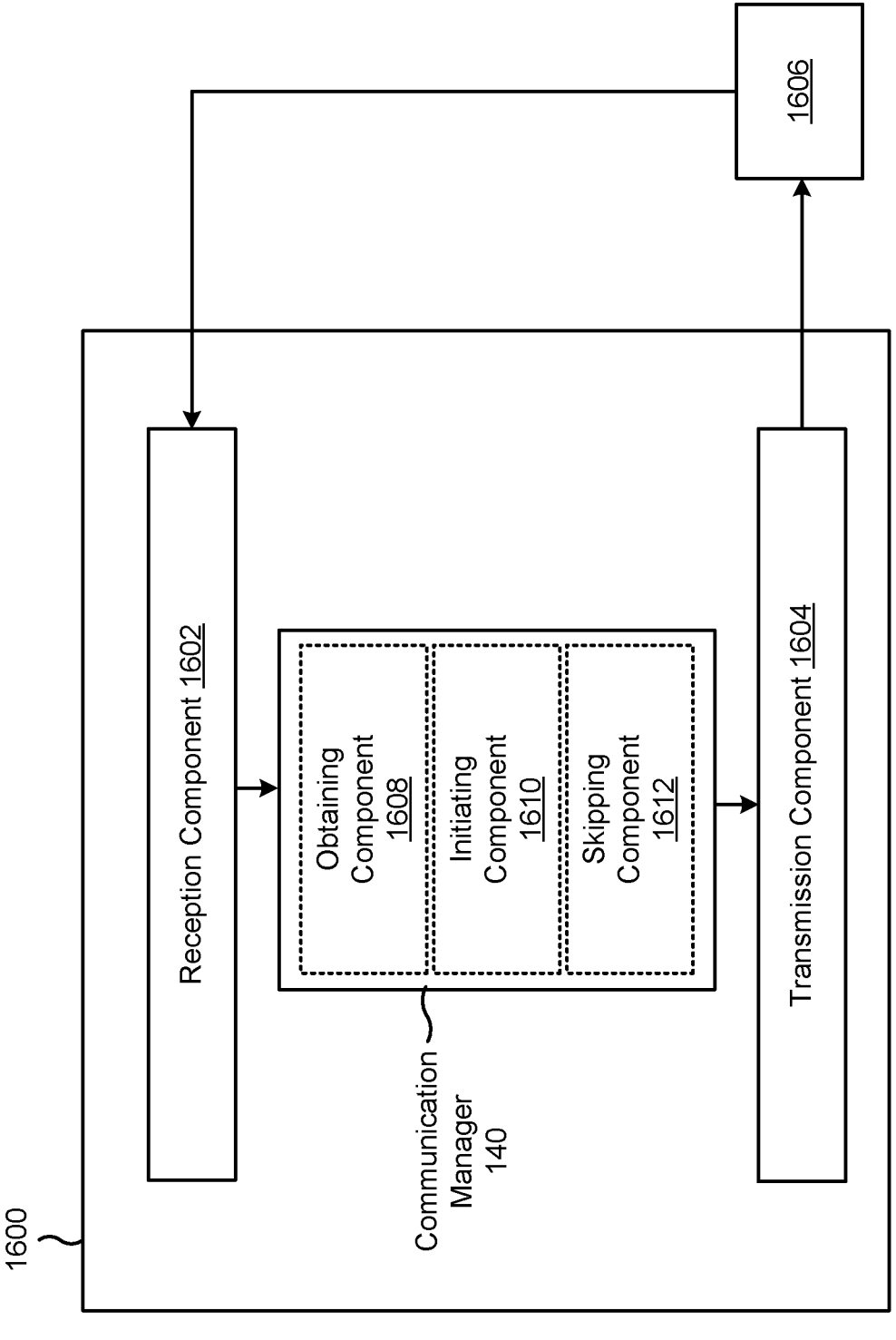
FIG. 16 is a diagram of an example apparatus for wireless communication, in accordance with the present disclosure.

FIG. 16 is a diagram of an example apparatus 1600 for wireless communication, in accordance with the present disclosure. The apparatus 1600 may be a UE, or a UE may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include the communication manager 140. The communication manager 140 may include one or more of an obtaining component 1608, an initiating component 1610, or a skipping component 1612, among other examples.

In some aspects, the apparatus 1600 may be configured to perform one or more operations described herein in connection with FIGS. 8-11. Additionally, or alternatively, the apparatus 1600 may be configured to perform one or more processes described herein, such as process 1200 of FIG. 12, process 1300 of FIG. 13, or a combination thereof. In some aspects, the apparatus 1600 and/or one or more components shown in FIG. 16 may include one or more components of the UE described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include one or more antennas, a modem, a demodulator, a MIMO detector, a receive processor, a controller/processor, a memory, or a combination thereof, of the UE described in connection with FIG. 2.

The transmission component 1604 may transmit communications, such as reference signals, control information, data communications, or a combination thereof, to the apparatus 1606. In some aspects, one or more other components of the apparatus 1600 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modem, a modulator, a transmit MIMO processor, a transmit processor, a controller/processor, a memory, or a combination thereof, of the UE described in connection with FIG. 2. In some aspects, the transmission component 1604 may be co-located with the reception component 1602 in a transceiver.

The obtaining component 1608 may obtain slot information that indicates whether a slot is a half-duplex slot or a full-duplex slot and that indicates a frequency structure of the full-duplex slot. The reception component 1602 may receive segmentation information that indicates a plurality of slot segments within the slot and that indicates a skipping order for the plurality of slot segments. The initiating component 1610 may initiate a partial uplink transmission. The skipping component 1612 may perform resource skipping in one or more slot segments of the plurality of slot segments based at least in part on the slot information and the segmentation information.

The reception component 1602 may receive resource skipping information, associated with a partial uplink transmission in a full-duplex slot, that indicates a skipping order for a plurality of resources in an uplink portion of the full-duplex slot based at least in part on a proximity of the plurality of resources to a downlink portion of the full-duplex slot, and that indicates a granularity to be used for performing a resource skipping operation in accordance with the skipping order. The initiating component 1610 may initiate the partial uplink transmission. The skipping component 1612 may perform the resource skipping operation based at least in part on the resource skipping information.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

Figure 17:
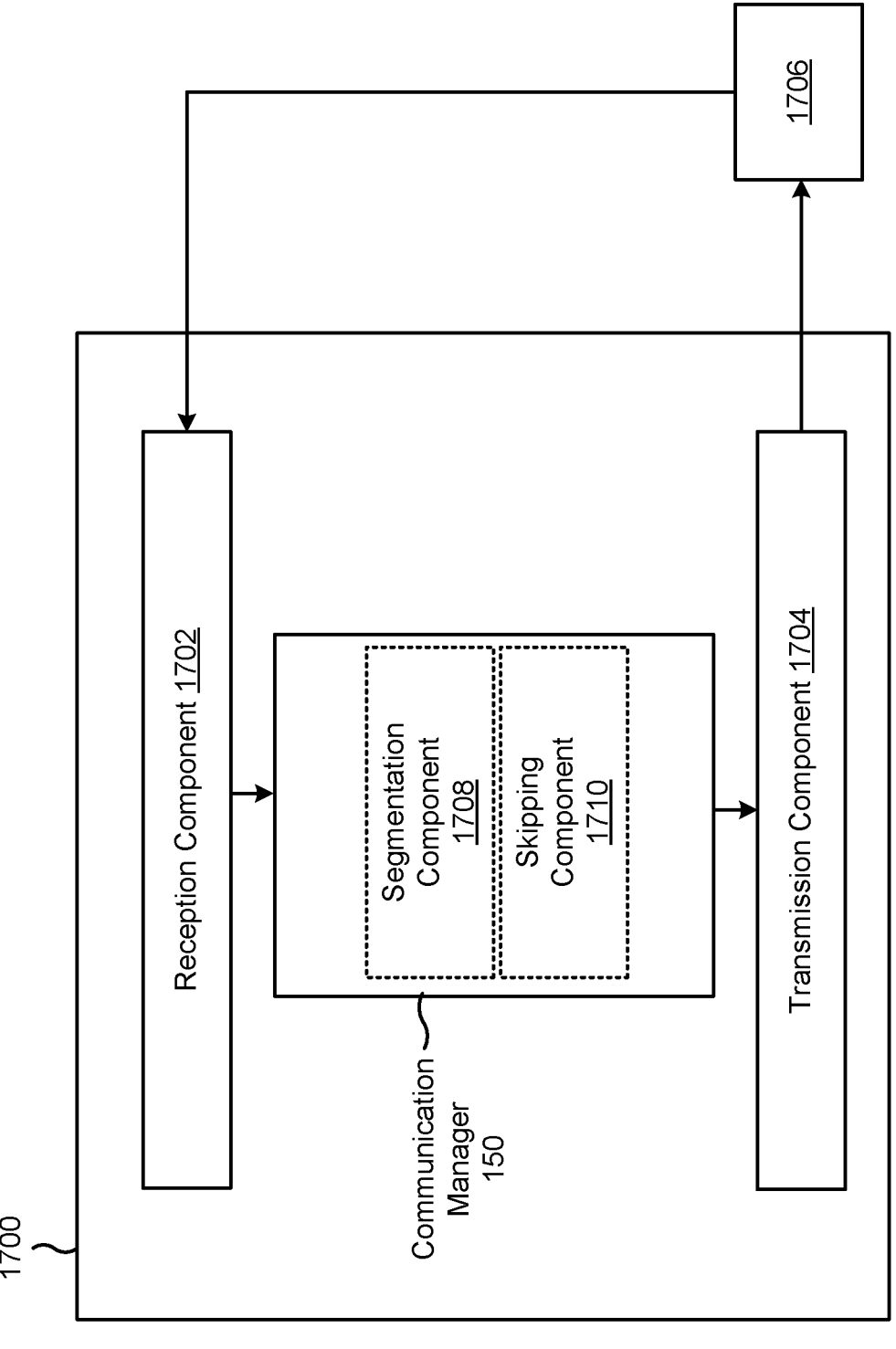
FIG. 17 is a diagram of an example apparatus for wireless communication, in accordance with the present disclosure.

FIG. 17 is a diagram of an example apparatus 1700 for wireless communication, in accordance with the present disclosure. The apparatus 1700 may be a network node, or a network node may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE, a base station, or another wireless communication device) using the reception component 1702 and the transmission component 1704. As further shown, the apparatus 1700 may include the communication manager 150. The communication manager 150 may include one or more of a segmentation component 1708 and/or a skipping component 1710, among other examples.

In some aspects, the apparatus 1700 may be configured to perform one or more operations described herein in connection with FIGS. 8-11. Additionally, or alternatively, the apparatus 1700 may be configured to perform one or more processes described herein, such as process 1400 of FIG. 14, process 1500 of FIG. 15, or a combination thereof. In some aspects, the apparatus 1700 and/or one or more components shown in FIG. 17 may include one or more components of the network node described in connection with FIG. 2. Additionally, or alternatively, one or more components shown in FIG. 17 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1700. In some aspects, the reception component 1702 may include one or more antennas, a modem, a demodulator, a MIMO detector, a receive processor, a controller/processor, a memory, or a combination thereof, of the network node described in connection with FIG. 2.

The transmission component 1704 may transmit communications, such as reference signals, control information, data communications, or a combination thereof, to the apparatus 1706. In some aspects, one or more other components of the apparatus 1700 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modem, a modulator, a transmit MIMO processor, a transmit processor, a controller/processor, a memory, or a combination thereof, of the network node described in connection with FIG. 2. In some aspects, the transmission component 1704 may be co-located with the reception component 1702 in a transceiver.

The transmission component 1704 may transmit slot information that indicates whether a slot is a half-duplex slot or a full-duplex slot and that indicates a frequency structure of the full-duplex slot. The segmentation component 1708 and/or the transmission component 1704 may transmit segmentation information that indicates a plurality of slot segments within the slot and that indicates a skipping order for the plurality of slot segments. The reception component 1702 may receive a partial uplink transmission that includes a resource skipping in one or more slot segments of the plurality of slot segments in accordance with the segmentation information.

The skipping component 1710 and/or the transmission component 1704 may transmit resource skipping information, associated with partial uplink transmissions in a full-duplex slot, that indicates a skipping order for a plurality of resources in an uplink portion of the full-duplex slot based at least in part on a proximity of the plurality of resources to a downlink portion of the full-duplex slot, and that indicates a granularity to be used for performing a resource skipping operation in accordance with the skipping order. The reception component 1702 may receive a partial uplink transmission that includes a resource skipping operation that is based at least in part on the resource skipping information.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

The following provides an overview of some Aspects of the present disclosure:

Aspect 1: A method of wireless communication performed by a user equipment (UE), comprising: obtaining slot information that indicates whether a slot is a half-duplex slot or a full-duplex slot and that indicates a frequency structure of the full-duplex slot; receiving segmentation information that indicates a plurality of slot segments within the slot and that indicates a skipping order for the plurality of slot segments; initiating a partial uplink transmission; and performing resource skipping in one or more slot segments of the plurality of slot segments based at least in part on the slot information and the segmentation information.

Aspect 2: The method of Aspect 1, wherein the segmentation information is configured separately for the half-duplex slot and for the full-duplex slot.

Aspect 3: The method of any of Aspects 1-2, wherein the segmentation information is associated with an uplink grant and indicates to use a first number of slot segments or a first resource skipping order for the half-duplex slot and to use a second number of slot segments or a second resource skipping order for the full-duplex slot.

Aspect 4: The method of any of Aspects 1-3, wherein performing the resource skipping comprises skipping an entirety of a slot segment based at least in part on a complete overlap between the slot segment and a downlink resource.

Aspect 5: The method of any of Aspects 1-4, wherein performing the resource skipping comprises skipping a portion of a slot segment based at least in part on a partial overlap between the slot segment and a downlink resource.

Aspect 6: The method of any of Aspects 1-5, wherein the segmentation information is indicated per-grant, and the plurality of slot segments within the slot are based at least in part on a dynamic indication.

Aspect 7: The method of any of Aspects 1-6, wherein the segmentation information is indicated per-bandwidth part of a plurality of bandwidth parts.

Aspect 8: The method of Aspect 7, wherein a segmentation of the slot into the plurality of slot segments uses a same segmentation as the bandwidth part in the half-duplex slot, or uses a different segmentation, based at least in part on the bandwidth part being within an uplink sub-band.

Aspect 9: The method of Aspect 7, wherein a segmentation of the slot into the plurality of slot segments is defined by an overlap between the bandwidth part and an uplink sub-band based at least in part on the bandwidth part being larger than the uplink sub-band.

Aspect 10: The method of any of Aspects 1-9, wherein the segmentation information is indicated per sub-band of a plurality of sub-bands and each sub-band of the plurality of sub-bands is divided into a plurality of segments, wherein each segment is associated with a skipping order for skipping partial uplink transmissions.

Aspect 11: The method of Aspect 10, wherein the slot includes a plurality of sub-bands, and a segmentation of the slot into the plurality of slot segments is performed over all sub-bands of the plurality of sub-bands jointly or independently.

Aspect 12: The method of Aspect 10, wherein the slot includes a plurality of sub-bands, and a segmentation of the slot into the plurality of slot segments is performed in only one sub-band of the plurality of sub-bands.

Aspect 13: A method of wireless communication performed by a user equipment (UE), comprising: receiving resource skipping information, associated with a partial uplink transmission in a full-duplex slot, that indicates a skipping order for a plurality of resources in an uplink portion of the full-duplex slot based at least in part on a proximity of the plurality of resources to a downlink portion of the full-duplex slot, and that indicates a granularity to be used for performing a resource skipping operation in accordance with the skipping order; initiating the partial uplink transmission; and performing the resource skipping operation based at least in part on the resource skipping information.

Aspect 14: The method of Aspect 13, wherein the granularity indicates a number of resource blocks that are to be skipped for each resource skipping operation.

Aspect 15: The method of any of Aspects 13-14, wherein the granularity is based at least in part on a radio resource control configuration of the UE.

Aspect 16: The method of any of Aspects 13-15, wherein performing the resource skipping operation comprises skipping a number of resources of the plurality of resources based at least in part on the granularity and based at least in part on the number of resources being closer to the downlink portion of the full-duplex slot than a remainder of resources of the plurality of resources are to the downlink portion of the full-duplex slot.

Aspect 17: The method of any of Aspects 13-16, wherein performing the resource skipping operation comprises performing the resource skipping operation on one or more levels of the uplink portion of the full-duplex slot based at least in part on the granularity.

Aspect 18: The method of Aspect 17, wherein the one or more levels are based at least in part on a number of available bits at the UE for performing the partial uplink transmission.

Aspect 19: The method of any of Aspects 13-18, wherein performing the resource skipping operation comprises skipping one or more resources on a single side of the uplink portion of the full-duplex slot based at least in part on a slot structure or radio resource control configuration information.

Aspect 20: The method of any of Aspects 13-19, wherein performing the resource skipping operation comprises skipping one or more resources on both sides of the uplink portion of the full-duplex slot based at least in part on a slot structure or radio resource control configuration information.

Aspect 21: A method of wireless communication performed by a network node, comprising: transmitting slot information that indicates whether a slot is a half-duplex slot or a full-duplex slot and that indicates a frequency structure of the full-duplex slot; transmitting segmentation information that indicates a plurality of slot segments within the slot and that indicates a skipping order for the plurality of slot segments; and receiving a partial uplink transmission that includes a resource skipping in one or more slot segments of the plurality of slot segments in accordance with the segmentation information.

Aspect 22: The method of Aspect 21, wherein the segmentation information is indicated per-grant, and the plurality of slot segments within the slot are based at least in part on a dynamic indication.

Aspect 23: The method of any of Aspects 21-22, wherein the segmentation information is indicated per-bandwidth part of a plurality of bandwidth parts.

Aspect 24: The method of Aspect 23, wherein a segmentation of the slot into the plurality of slot segments uses a same segmentation as the bandwidth part in the half-duplex slot based at least in part on the bandwidth part being within an uplink sub-band, or is defined by an overlap between the bandwidth part and an uplink sub-band based at least in part on the bandwidth part being larger than the uplink sub-band.

Aspect 25: The method of any of Aspects 21-24, wherein the segmentation information is indicated per sub-band of a plurality of sub-bands and each sub-band of the plurality of sub-bands is divided into a plurality of segments, wherein each segment is associated with a skipping order for skipping partial uplink transmissions.

Aspect 26: The method of Aspect 25, wherein the slot includes a plurality of sub-bands, and a segmentation of the slot into the plurality of slot segments is performed over all sub-bands of the plurality of sub-bands, or in only one sub-band of the plurality of sub-bands.

Aspect 27: A method of wireless communication performed by a network node, comprising: transmitting resource skipping information, associated with partial uplink transmissions in a full-duplex slot, that indicates a skipping order for a plurality of resources in an uplink portion of the full-duplex slot based at least in part on a proximity of the plurality of resources to a downlink portion of the full-duplex slot, and that indicates a granularity to be used for performing a resource skipping operation in accordance with the skipping order; and receiving a partial uplink transmission that includes a resource skipping operation that is based at least in part on the resource skipping information.

Aspect 28: The method of Aspect 27, wherein the granularity indicates a number of resource blocks that are to be skipped for each resource skipping operation.

Aspect 29: The method of any of Aspects 27-28, wherein the resource skipping operation comprises a skipping of one or more levels of the uplink portion of the full-duplex slot based at least in part on the granularity, wherein the one or more levels are based at least in part on a number of available bits that are available for the partial uplink transmission.

Aspect 30: The method of any of Aspects 27-29, wherein the resource skipping operation comprises a skipping of one or more resources on a single side of the uplink portion of the full-duplex slot, or a skipping of one or more resources on both sides of the uplink portion of the full-duplex slot, based at least in part on a slot structure or radio resource control configuration information.

Aspect 31: An apparatus for wireless communication at a device, comprising a processor; memory coupled with the processor; and instructions stored in the memory and executable by the processor to cause the apparatus to perform the method of one or more of Aspects 1-30.

Aspect 32: A device for wireless communication, comprising a memory and one or more processors coupled to the memory, the one or more processors configured to perform the method of one or more of Aspects 1-30.

Aspect 33: An apparatus for wireless communication, comprising at least one means for performing the method of one or more of Aspects 1-30.

Aspect 34: A non-transitory computer-readable medium storing code for wireless communication, the code comprising instructions executable by a processor to perform the method of one or more of Aspects 1-30.

Aspect 35: A non-transitory computer-readable medium storing a set of instructions for wireless communication, the set of instructions comprising one or more instructions that, when executed by one or more processors of a device, cause the device to perform the method of one or more of Aspects 1-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:

one or more memories; and one or more processors, coupled to the one or more memories, configured to:

obtain slot information that indicates whether a slot is a half-duplex slot or a full-duplex slot and that indicates a frequency structure of the full-duplex slot;

receive segmentation information that indicates a plurality of slot segments within the slot and that indicates a skipping order for the plurality of slot segments;

initiate a partial uplink transmission, wherein the partial uplink transmission comprises a data transmission that occupies a first portion of a resource allocation, and wherein a second portion of the resource allocation that is associated with one or more appended bits is unoccupied; and perform resource skipping in one or more slot segments of the plurality of slot segments based at least in part on the slot information and the segmentation information.

2. The apparatus of claim 1, wherein the segmentation information is configured separately for the half-duplex slot and for the full-duplex slot.

3. The apparatus of claim 1, wherein the segmentation information is associated with an uplink grant and indicates to use a first number of slot segments or a first resource skipping order for the half-duplex slot and to use a second number of slot segments or a second resource skipping order for the full-duplex slot.

4. The apparatus of claim 1, wherein the one or more processors, to perform the resource skipping, are configured to skip an entirety of a slot segment based at least in part on a complete overlap between the slot segment and a downlink resource.

5. The apparatus of claim 1, wherein the one or more processors, to perform the resource skipping, are configured to skip a portion of a slot segment based at least in part on a partial overlap between the slot segment and a downlink resource.

6. The apparatus of claim 1, wherein the segmentation information is indicated per-grant, and the plurality of slot segments within the slot are based at least in part on a dynamic indication.

7. The apparatus of claim 1, wherein the segmentation information is indicated per-bandwidth part of a plurality of bandwidth parts.

8. The apparatus of claim 7, wherein a segmentation of the slot into the plurality of slot segments uses a same segmentation as the bandwidth part in the half-duplex slot, or uses a different segmentation, based at least in part on the bandwidth part being within an uplink sub-band.

9. The apparatus of claim 7, wherein a segmentation of the slot into the plurality of slot segments is defined by an overlap between the bandwidth part and an uplink sub-band based at least in part on the bandwidth part being larger than the uplink sub-band.

10. The apparatus of claim 1, wherein the segmentation information is indicated per sub-band of a plurality of sub-bands and each sub-band of the plurality of sub-bands is divided into a plurality of segments, wherein each segment is associated with a skipping order for skipping partial uplink transmissions.

11. The apparatus of claim 10, wherein the slot includes the plurality of sub-bands, and a segmentation of the slot into the plurality of slot segments is performed over all sub-bands of the plurality of sub-bands jointly or independently.

12. The apparatus of claim 10, wherein the slot includes the plurality of sub-bands, and a segmentation of the slot into the plurality of slot segments is performed in only one sub-band of the plurality of sub-bands.

13. An apparatus for wireless communication at a user equipment (UE), comprising:
one or more memories; and
one or more processors, coupled to the one or more memories, configured to:
receive resource skipping information, associated with a partial uplink transmission in a full-duplex slot, that indicates a skipping order for a plurality of resources in an uplink portion of the full-duplex slot based at least in part on a proximity of the plurality of resources to a downlink portion of the full-duplex slot, and that indicates a granularity to be used for performing a resource skipping operation in accordance with the skipping order;
initiate the partial uplink transmission, wherein the partial uplink transmission comprises a data transmission that occupies a first portion of a resource allocation, and wherein a second portion of the resource allocation that is associated with one or more appended bits is unoccupied; and
perform the resource skipping operation based at least in part on the resource skipping information.

14. The apparatus of claim 13, wherein the granularity indicates a number of resource blocks that are to be skipped for the resource skipping operation.

15. The apparatus of claim 13, wherein the granularity is based at least in part on a radio resource control configuration of the UE.

16. The apparatus of claim 13, wherein the one or more processors, to perform the resource skipping operation, are configured to skip a number of resources of the plurality of resources based at least in part on the granularity and based at least in part on the number of resources being closer to the downlink portion of the full-duplex slot than a remainder of resources of the plurality of resources are to the downlink portion of the full-duplex slot.

17. The apparatus of claim 13, wherein the one or more processors, to perform the resource skipping operation, are configured to perform the resource skipping operation on one or more levels of the uplink portion of the full-duplex slot based at least in part on the granularity.

18. The apparatus of claim 17, wherein the one or more levels are based at least in part on a number of available bits at the UE for performing the partial uplink transmission.

19. The apparatus of claim 13, wherein the one or more processors, to perform the resource skipping operation, are configured to skip one or more resources on a single side of the uplink portion of the full-duplex slot based at least in part on a slot structure or radio resource control configuration information.

20. The apparatus of claim 13, wherein the one or more processors, to perform the resource skipping operation, are configured to skip one or more resources on both sides of the uplink portion of the full-duplex slot based at least in part on a slot structure or radio resource control configuration information.

21. An apparatus for wireless communication at a network node, comprising:
one or more memories; and
one or more processors, coupled to the one or more memories, configured to:
transmit slot information that indicates whether a slot is a half-duplex slot or a full-duplex slot and that indicates a frequency structure of the full-duplex slot;
transmit segmentation information that indicates a plurality of slot segments within the slot and that indicates a skipping order for the plurality of slot segments; and
receive a partial uplink transmission that includes a resource skipping operation in one or more slot segments of the plurality of slot segments in accordance with the segmentation information, wherein the partial uplink transmission comprises a data transmission that occupies a first portion of a resource allocation, and wherein a second portion of the resource allocation associated with one or more appended bits is unoccupied.

22. The apparatus of claim 21, wherein the segmentation information is indicated per-grant, and the plurality of slot segments within the slot are based at least in part on a dynamic indication.

23. The apparatus of claim 21, wherein the segmentation information is indicated per-bandwidth part of a plurality of bandwidth parts.

24. The apparatus of claim 23, wherein a segmentation of the slot into the plurality of slot segments uses a same segmentation as the bandwidth part in the half-duplex slot based at least in part on the bandwidth part being within an uplink sub-band, or is defined by an overlap between the bandwidth part and the uplink sub-band based at least in part on the bandwidth part being larger than the uplink sub-band.

25. The apparatus of claim 21, wherein the segmentation information is indicated per sub-band of a plurality of sub-bands and each sub-band of the plurality of sub-bands is divided into a plurality of segments, wherein each segment is associated with a skipping order for skipping partial uplink transmissions.

26. The apparatus of claim 25, wherein the slot includes the plurality of sub-bands, and a segmentation of the slot into the plurality of slot segments is performed over all sub-bands of the plurality of sub-bands, or in only one sub-band of the plurality of sub-bands.

27. An apparatus for wireless communication at a network node, comprising:

one or more memories; and one or more processors, coupled to the one or more memories, configured to:

transmit resource skipping information, associated with partial uplink transmissions in a full-duplex slot, that indicates a skipping order for a plurality of resources in an uplink portion of the full-duplex slot based at least in part on a proximity of the plurality of resources to a downlink portion of the full-duplex slot, and that indicates a granularity to be used for performing a resource skipping operation in accordance with the skipping order; and receive a partial uplink transmission that includes the resource skipping operation, wherein the partial uplink transmission is based at least in part on the resource skipping information, and wherein the partial uplink transmission comprises a data transmission that occupies a first portion of a resource allocation, and wherein a second portion of the resource allocation associated with one or more appended bits is unoccupied.

28. The apparatus of claim 27, wherein the granularity indicates a number of resource blocks that are to be skipped for the resource skipping operation.

29. The apparatus of claim 27, wherein the resource skipping operation comprises a skipping of one or more levels of the uplink portion of the full-duplex slot based at least in part on the granularity, wherein the one or more levels are based at least in part on a number of available bits that are available for the partial uplink transmission.

30. The apparatus of claim 27, wherein the resource skipping operation comprises a skipping of one or more resources on a single side of the uplink portion of the full-duplex slot, or a skipping of one or more resources on both sides of the uplink portion of the full-duplex slot, based at least in part on a slot structure or radio resource control configuration information.

* * * * *